United States Patent [19]
Chopra et al.

[11] Patent Number: 5,345,216
[45] Date of Patent: Sep. 6, 1994

[54] METHOD AND APPARATUS FOR QUALIFYING DATA PEAKS

[75] Inventors: Kiran Chopra; David C. Geminden, both of Longmont; Debra C. Mahoney, Boulder, all of Colo.

[73] Assignee: Storage Technology Corporation, Louisville, Colo.

[21] Appl. No.: 23,671

[22] Filed: Feb. 26, 1993

[51] Int. Cl.⁵ .......................... G11B 5/02; G06F 11/08
[52] U.S. Cl. ............................... 340/146.2; 307/351; 360/46; 360/53
[58] Field of Search .............. 340/146.2; 307/361, 307/351; 360/39, 46, 53

[56] References Cited

U.S. PATENT DOCUMENTS

| | | | |
|---|---|---|---|
| 3,631,263 | 12/1971 | Graham et al. | 307/361 |
| 4,227,175 | 10/1980 | Newman | 340/164.2 |
| 4,626,933 | 12/1986 | Bucska et al. | 360/51 |
| 4,634,896 | 1/1987 | Shrinkle | 307/351 |
| 5,231,544 | 7/1993 | Matsushige | 360/40 |

OTHER PUBLICATIONS

"A Maximum Likelihood Peak Detecting Channel", K. Chopra and D. D. Woods, IEEE Transactions on Magnetics, vol. 27, No. 6, Nov. 1991.

"Sequence (Viterbi–Equivalent) Decoding," Richard C. Schneider, IEEE Transactions on Magnetics, vol. 24, No. 6, Nov. 1988.

"A Soft Decision Detection Method for Run-Length Limited Recording Channels", K. Chopra et al., Conference, Nov. 5–7, 1990.

*Primary Examiner*—John S. Heyman
*Attorney, Agent, or Firm*—Duft, Graziano & Forest

[57] ABSTRACT

A system and method for qualifying data peaks. A post-peak eliminator receives digital signals representing the amplitude of signal peaks. The digital value of a received peak is stored and compared with the value of subsequently received peaks. The peak having the largest amplitude is assumed to be the valid peak. The post-peak eliminator eliminates all invalid post-peaks and applies a signal stream representing valid peaks and any invalid pre-peaks to a pre-peak eliminator. The pre-peak eliminator includes a shift register and a control circuit therefor that operates on a state machine basis. The shift register receives and stores all signals, but eliminates any invalid pre-peaks immediately upon a determination that a received signal represents an invalid peak.

28 Claims, 17 Drawing Sheets

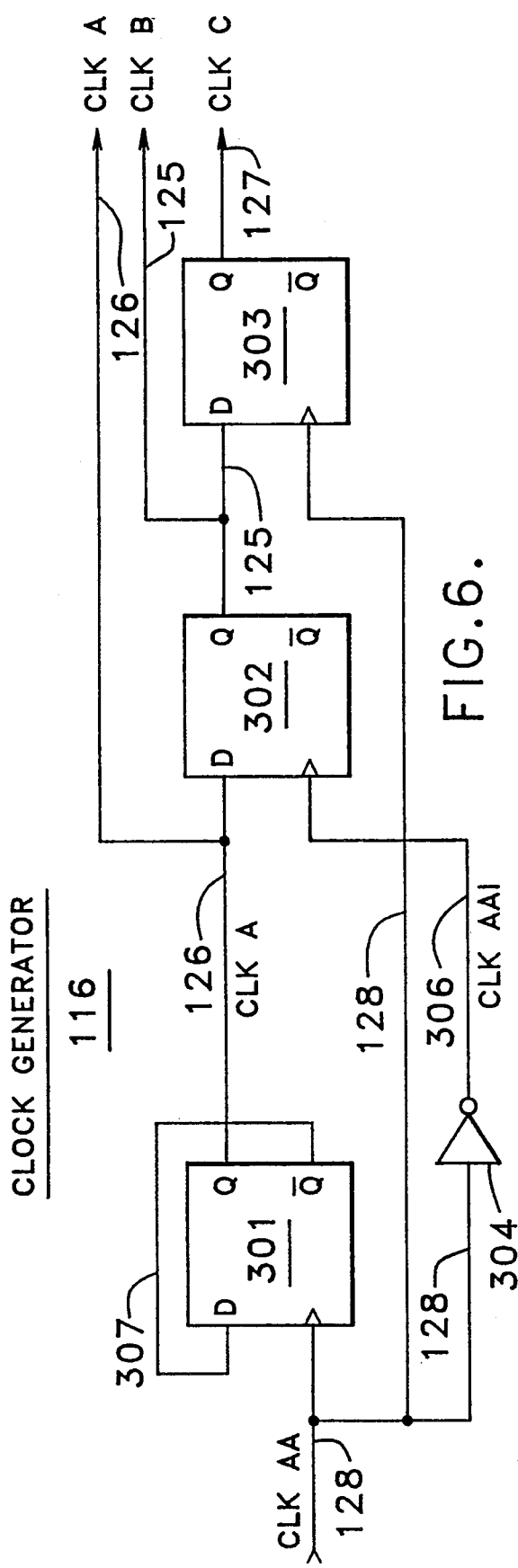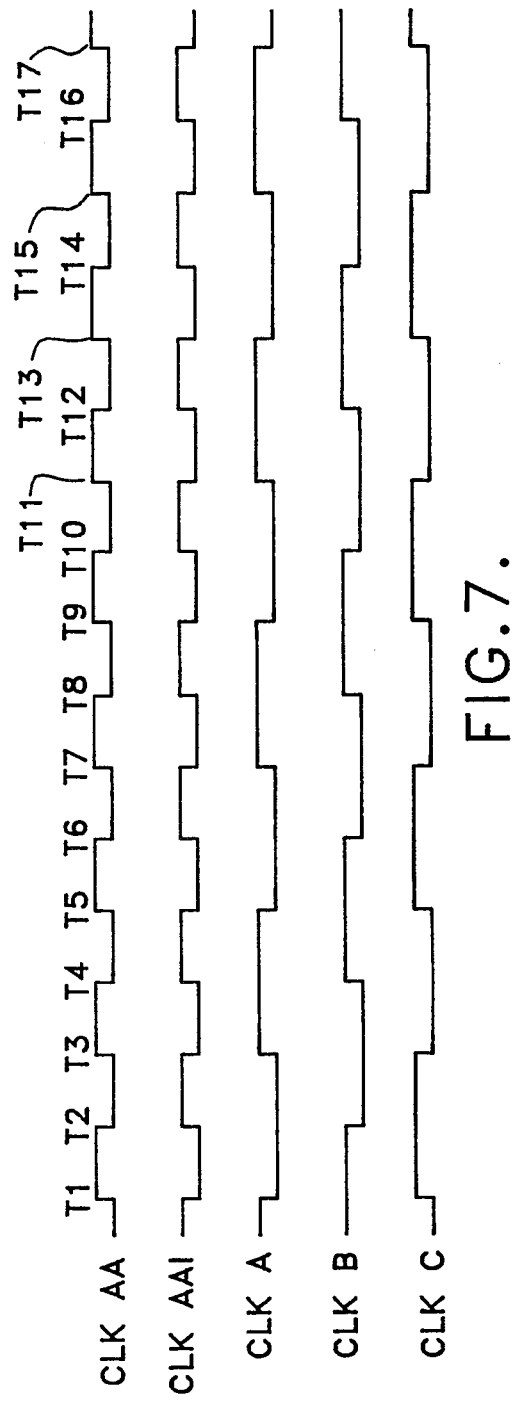

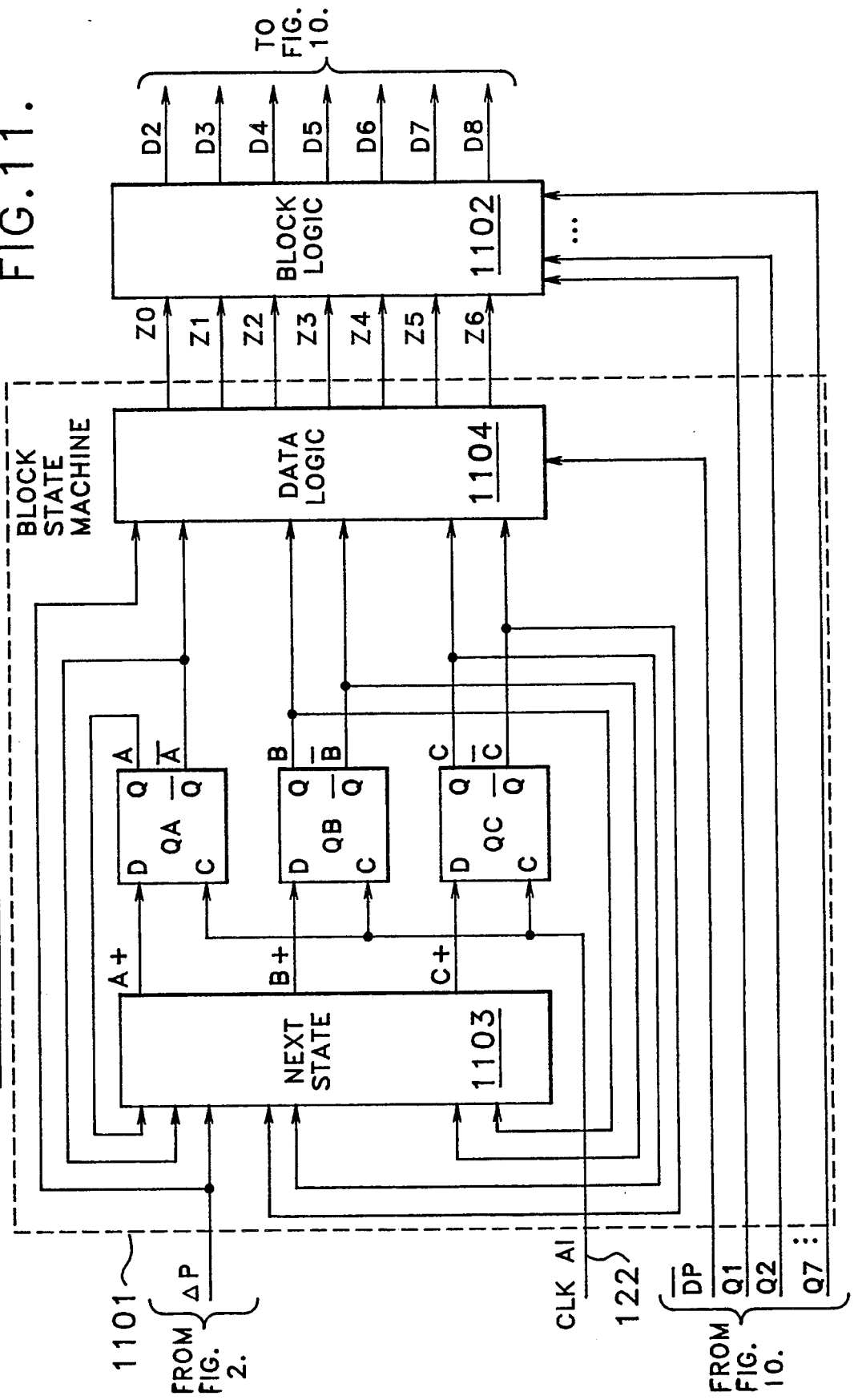

ROM

| SIGNAL VALUES / BINARY ADDRESS | BINARY DATA | SETS THRESHOLD TO- |
|---|---|---|
| 0-64 | 150 | P25% |
| 65-86 | 171 | P50% |
| 87-107 | 192 | P75% |
| 108-128 | 150 | P25% |
| 129-150 | 107 | N25% |
| 151-171 | 64 | N75% |
| 172-192 | 86 | N50% |
| 193-255 | 107 | N25% |

DATA LOGIC     1104

$Z0 = \overline{DP} + \triangle P$ $Z1 = (\overline{DP} + \triangle P + \overline{C}) \cdot (\overline{DP} + \triangle P + \overline{B}) \cdot (\overline{DP} + \triangle P + \overline{A})$ $Z2 = (\overline{DP} + \triangle P + \overline{B}) \cdot (\overline{DP} + \triangle P + \overline{A})$ $Z3 = (\overline{DP} + \triangle P + \overline{B} + C) \cdot (\overline{DP} + \triangle P + \overline{A})$ $Z4 = \overline{DP} + \triangle P + \overline{A}$ $Z5 = (\overline{DP} + \triangle P + \overline{A} + \overline{C}) \cdot (\overline{DP} + \triangle P + \overline{A} + B)$ $Z6 = \overline{DP} + \triangle P + \overline{A} + B$

BLOCK LOGIC $D2 = Q1 \cdot Z0$ $D3 = Q2 \cdot Z1$ $D4 = Q3 \cdot Z2$ $D5 = Q4 \cdot Z3$ $D6 = Q5 \cdot Z4$ $D7 = Q6 \cdot Z5$ $D8 = Q7 \cdot Z6$

NEXT STATE $A^+ = (\overline{C} \cdot \overline{\triangle P} \cdot B) + (C \cdot \overline{\triangle P} \cdot A)$ $B^+ = (\overline{C} \cdot \overline{\triangle P} \cdot B) + (C \cdot \overline{\triangle P} \cdot \overline{A})$ $C^+ = (\overline{C} \cdot \overline{A} \cdot \overline{B}) + (\overline{\triangle P} \cdot \overline{A} \cdot \overline{B}) + (\overline{\triangle P} \cdot A \cdot B)$

FIG. 21.

ROM

| SIGNAL VALUES / BINARY ADDRESS | BINARY DATA | SETS THRESHOLD TO— |
|---|---|---|
| 255 ↓ 214 | 128 | N 0.58% |
| 213 | 127 | N 1.75% |
| 212 | 126 | N 2.92% |
| ⋮ | ⋮ | ⋮ |
| 130 | 44 | N 98.83% |
| 129 | 43 | N 100% |
| 128 | 214 | P 100% |
| 127 | 213 | P 98.83% |
| ⋮ | ⋮ | ⋮ |
| 45 | 131 | P 2.92% |
| 44 | 130 | P 1.75% |
| 43 ↓ 0 | 129 | P 0.58% |

FIG. 23.

METHOD AND APPARATUS FOR QUALIFYING DATA PEAKS

FIELD OF THE INVENTION

The present invention relates to a method and apparatus for qualifying valid data peaks in a read channel of a magnetic tape or disk system. More particularly, the invention relates to a method and apparatus for qualifying valid data peaks received along with invalid peaks during the reading of data from a magnetic medium such as a tape or disk. Still more particularly, the invention relates to a method and apparatus for eliminating invalid pre-peaks and post-peaks from a data stream received during the reading of a magnetic medium such as a tape or disk.

PROBLEM

A problem commonly encountered during the reading of data from a magnetic medium, such as a disk or tape (hereinafter tape), is the reception of invalid signal peaks representing noise and the like along with the valid signal peaks that represent data stored on the tape. Facilities are needed to eliminate the received signal peaks which are invalid and to provide an output signal containing only the valid signal peaks.

The simplest solution is to use threshold detectors to filter out the peaks that do not exceed a prescribed signal level. However, false peaks may also exceed the prescribed threshold. Therefore this procedure is not, by itself, an adequate means for eliminating invalid peaks.

It is also known to use signal slope detection in combination with signal amplitude change in order to qualify valid data peaks. This is shown in U.S. Pat. No. 3,631,263 of Dec. 28, 1971, to Graham et al. While this approach represents a significant improvement over threshold detection, the circuitry required to achieve this is complex and expensive. Moreover, the slope or shape of a peak is not always an accurate indicator of which data peaks are valid and which are not. While the Graham et al. system is sufficient for some purposes, it is inadequate when the number of false peaks occurring both before and/or after a valid data peak exceeds the number of peaks the Graham et al. system was designed to accommodate.

U.S. Pat. No. 4,626,933 to Bucska et al. discloses a system for eliminating invalid pre-peaks and post peaks from a received data stream. Bucska et al.'s post-peak detector use an analog highest peak hold-type detector which operates upon the charged capacitor principle to detect a peak of the largest amplitude in a series of peaks of the same polarity. The peak having the largest amplitude is assumed to be the valid pulse and the subsequently received pulses of the same polarity, but of a lesser amplitude, are assumed to be invalid post-peak pulses. Bucska et al. use a pre-peak eliminator comprising a shift register controlled by a logic circuit to eliminate the invalid pulses of a given polarity that precede the reception of the valid pulse of the same polarity. Bucska et al. solves the time delay generator problem that might otherwise be encountered by implementing his exact peak elimination logic with phase loop clocks in a synchronized data domain.

Bucska et al.'s post-peak detector using charged capacitors suffers from the problem of timing and component drifting and leakage current due to aging and temperature changes. Bucska et al. also have the problem of the exact matching of components and component values so that their positive peak detector employing the charge capacitor principle is symmetrically identical to the components used in their negative peak detector. Bucska et al.'s shift register and qualifying logic that is used to eliminate the invalid pre-peaks may not always operate satisfactorily in conditions in which the extra pre-peaks precede a valid peak by a large number of bit cells. In other words, Bucska et al.'s circuit may produce invalid output signals when the valid peak is separated by six or seven Os from an invalid extra peak. In high resolution systems, Bucska et al.'s qualifying circuit is inadequate when the valid peak is separated from the invalid pre-peak by a number of Os beyond which the Bucska et al. circuit was designed to accommodate. This results in limiting the amount of pulse slimming that can be used in the read channel to remove intersymbol interference.

U.S. Pat. No. 4,634,896 to Schrinkle discloses a system which eliminates pre- and post-peaks with lower energy than a valid main peak. Schrinkle employs a slope detector post-peak eliminator that is similar to that of Bucska et at. and that which operates upon the charge capacitor principle. Schrinkle's post-peak detector utilizes the charge capacitor principle and is therefore subject to the same deficiencies as already mentioned for the analog charge capacitor post-peak eliminator of Bucska et al. Schrinkle eliminates invalid pre-peaks by utilizing cascades of delay elements to memorize the locations of the invalid pre-peaks prior to the reception of the higher amplitude valid peak. The circuitry employed by Schrinkle is subject to increased timing jitter and a resultant signal to noise loss in the data channel. When implemented in LSI circuitry, additional jitter can be caused by crosstalk between successive delay elements. Also, the number of delay elements employed by Schrinkle result in a limitation of the number of successive Os that can separate an invalid pre-peak and a valid data peak while permitting the invalid pre-peaks to be detected and eliminated.

The above-discussed prior art arrangements, while attempting to address the problem of pre-peak and post-peak elimination, are subject to further deficiencies in that they employ fixed level threshold detection circuitry. The noise that produces the pre-peaks also causes valid data peaks to drop to amplitude values less than the fixed threshold levels causing missing bit errors. By dynamically altering the threshold levels, valid peak drop-out detection can be improved.

It can therefore be seen that while the prior art has considered the problem of eliminating invalid signal peaks, the solutions provided by the prior art are not totally satisfactory for valid peak drop-outs and when the invalid peaks are greater in number and/or time separation than that which the prior art systems can accommodate.

SOLUTION

The present invention solves the above-discussed problems and achieves an advance in the art by providing a method and apparatus which can eliminate invalid pre-peaks and post-peaks and provide an output signal containing only valid data peaks. The present invention eliminates both invalid pre-peaks and post-peaks under circumstances in which these are greater in number and/or amplitude or time separation than those that can be accommodated by prior systems. The present invention eliminates invalid peaks in the neighborhood of a valid peak but avoids the signal to noise ratio loss associated with cascaded timers.

The post-peak eliminator of the invention eliminates unwanted peaks that follow a valid data peak of the same polarity while a pre-peak eliminator eliminates the unwanted signal peaks that precede a valid data peak of the same polarity. The post-peak eliminator comprises digital circuitry which receives and temporarily stores the digital value of each successive signal peak of a given polarity as well as an indication of the polarity of each peak. As long as the polarity of these received peaks remains unchanged, the digital circuitry receives each received peak and compares its amplitude to the previously-received peak of the same polarity whose amplitude is stored in a hold register. It updates the hold register if the amplitude of the newly-received signal exceeds that of the signal stored in the hold register. The newly-received signal is eliminated if its amplitude is less than that of a previously-received peak whose value is currently stored in the hold register. In other words, the digital value of a received signal of a given polarity remains stored in the hold register until it is replaced by a received signal of a larger amplitude and of the same polarity. By this means, the post-peak eliminator rejects the maximum number of invalid post-peak consistent with the code being utilized.

As a string of peaks of increasing amplitude and of the same polarity is received, a data output pulse is applied from the output of the post-peak eliminator and to the pre-peak eliminator. No output pulse is generated by the post-peak detector if a received peak has an amplitude less than that of a previously received peak whose amplitude is stored in the hold register.

The data pulses applied to the pre-peak eliminator from the post-peak eliminator represent signal peaks associated with all invalid pre-peaks as well as signal peaks associated with a valid data peak. The invalid post-peak signals are eliminated by the post-peak eliminator and not applied to the pre-peak eliminator. The pre-peak eliminator temporarily stores the received signals for a period of time sufficient to permit it to eliminate the signals representing invalid pre-peaks and to generate an output containing only valid data peaks.

The pre-peak eliminator of the invention comprises a plural stage shift register and a controller which operate on a state machine principle to store the characteristic of each received peak. It operates on the premise that the last received peak of a given polarity is the valid data peak while all received peaks preceding the valid data peak are invalid pre-peaks. At the end of a reception of a series of such peaks of a first polarity, the controller and the shift register reject the previously-received peaks of the same polarity and permit to pass through to the shift register output only the last received peak of a given polarity.

All successively received signals of a given polarity are entered into and shifted forward within the shift register by clock pulses received from the post-peak eliminator. At that time, the last received signal of the same polarity which, by this time is assumed to be the valid data signal and it is maintained within the shift register while all previously received signals are eliminated under the assumption that they are invalid pre-peak signals. This retained signal is ultimately outputted by the shift register in a data stream containing only valid data pulses. The shift register and the controlling logic therefor has sufficient capacity to store an invalid pre-peak that is separated by the maximum number of bit cells from the valid peak with the maximum being determined by the specific coding used such as, for example, 1,7 and 2,7.

The invention comprises a post-peak detector of the fixed threshold type as well as a post-peak detector of the dynamically variable threshold type. The use of dynamically controlled threshold, in some applications, permits an improved rejection of invalid peaks. In accordance with this embodiment the amplitude of signals stored in a negative hold register controls the positive threshold level while the amplitude of signals stored in a positive hold register controls the negative threshold level.

BRIEF DESCRIPTION OF THE DRAWING

The following and other advantages and features of the invention may be better understood from a reading of the following detailed description thereof in conjunction with the drawing in which:

FIG. 5 is positioned below FIG. 4, are a timing diagram for the operation of the post-peak eliminator 113 of FIGS. 1 and 2;

FIG. 6 discloses further details of the clock generator 116 of FIG. 1;

FIG. 7 is a timing diagram for the clock generator of FIG. 6;

FIG. 11 discloses details of data blocker 902;

FIG. 15 discloses Boolean equations for data logic 1104 of FIG. 11;

FIG. 16 discloses Boolean equations for block logic 1102 of FIG. 11;

FIG. 17, are a timing diagram for the operation of the post-peak eliminator 113 of FIGS. 1 and 3;

FIG. 20 is positioned below FIG. 19, are a timing diagram of the operation of the pre-peak eliminator 114 of FIGS. 1 and 9;

FIG. 21 discloses Boolean equations for the next state logic 1103 of FIG. 11;

FIG. 22 discloses status of flip-flops QA, QB, and QC of FIG. 11; and

FIG. 23 discloses an alternative manner in which ROM 301 may be used to provide variable threshold information.

DETAILED DESCRIPTION

Figure 1:
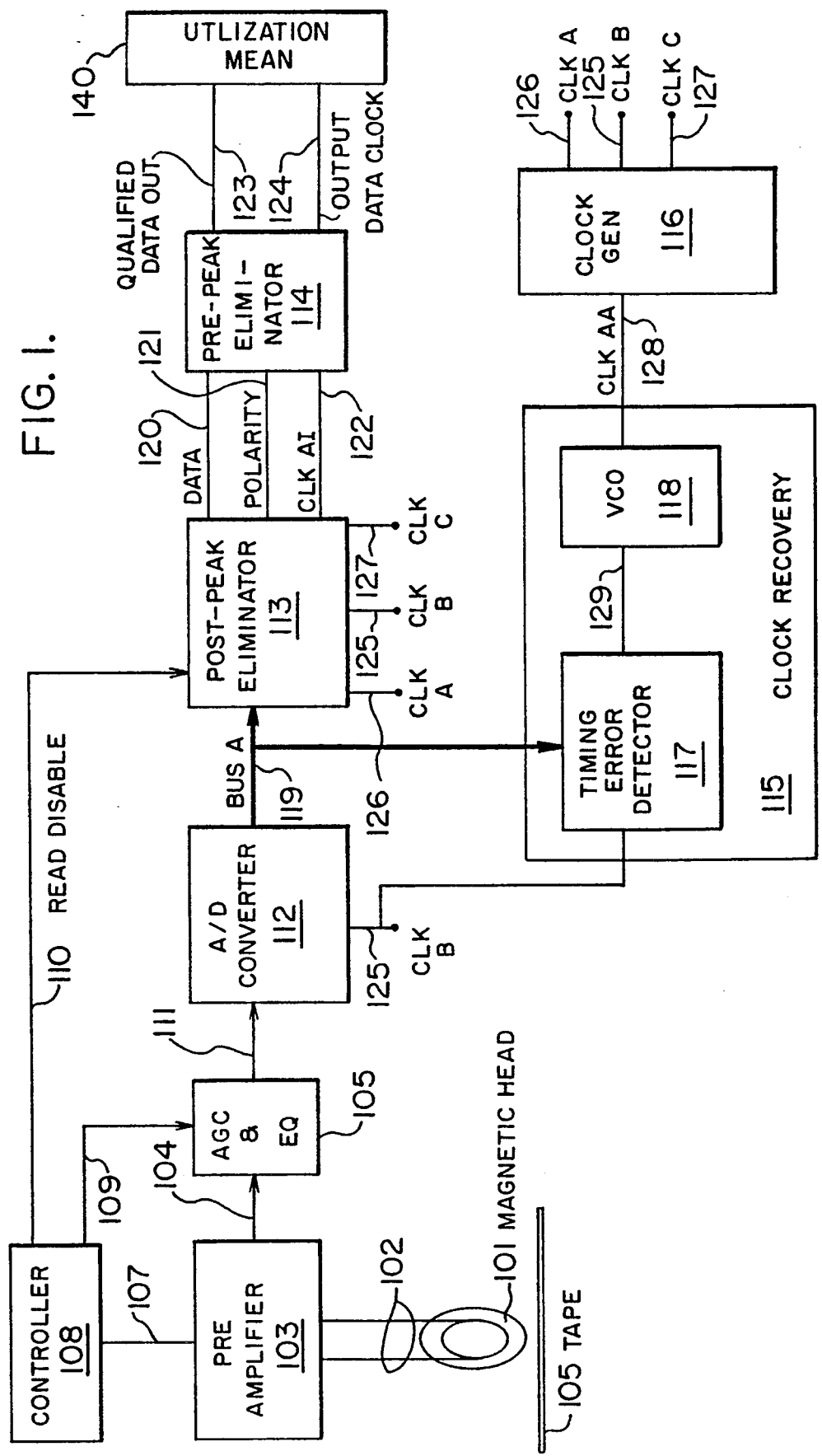
FIG. 1 is a block diagram of a system embodying the invention.

FIG. 1 is a simplified block diagram of the peak qualification system of the present invention. The system of FIG. 1 includes preamplifier 103 which cooperates with magnetic head 101 and conductors 102 to read data from a magnetic medium 105 such as a magnetic tape. Tape 105 is physically moved with respect to magnetic head 101 during the reading process so that magnetic flux passes through magnetic head 101 to generate read signals. These read signals are applied via path 102 to preamplifier 103. The tape output signals applied to preamplifier 103 are filtered and controlled in amplitude by the AGC and equalization circuit 104 to remove unwanted noise, and to shape and slim the data pulses. These filtered signals are applied over path 111 to the A to D converter 112 which converts the analog signals on path 111 to digital form.

Controller 108 controls the operation of preamplifier 103 over path 107 and controls operation of the AGC and equalization circuit 104 over path 109. The function of controller 108 includes the activation of elements 103 and 105 upon the beginning of a read operation and the deactivation of these elements upon the conclusion of a read operation.

Figure 4:
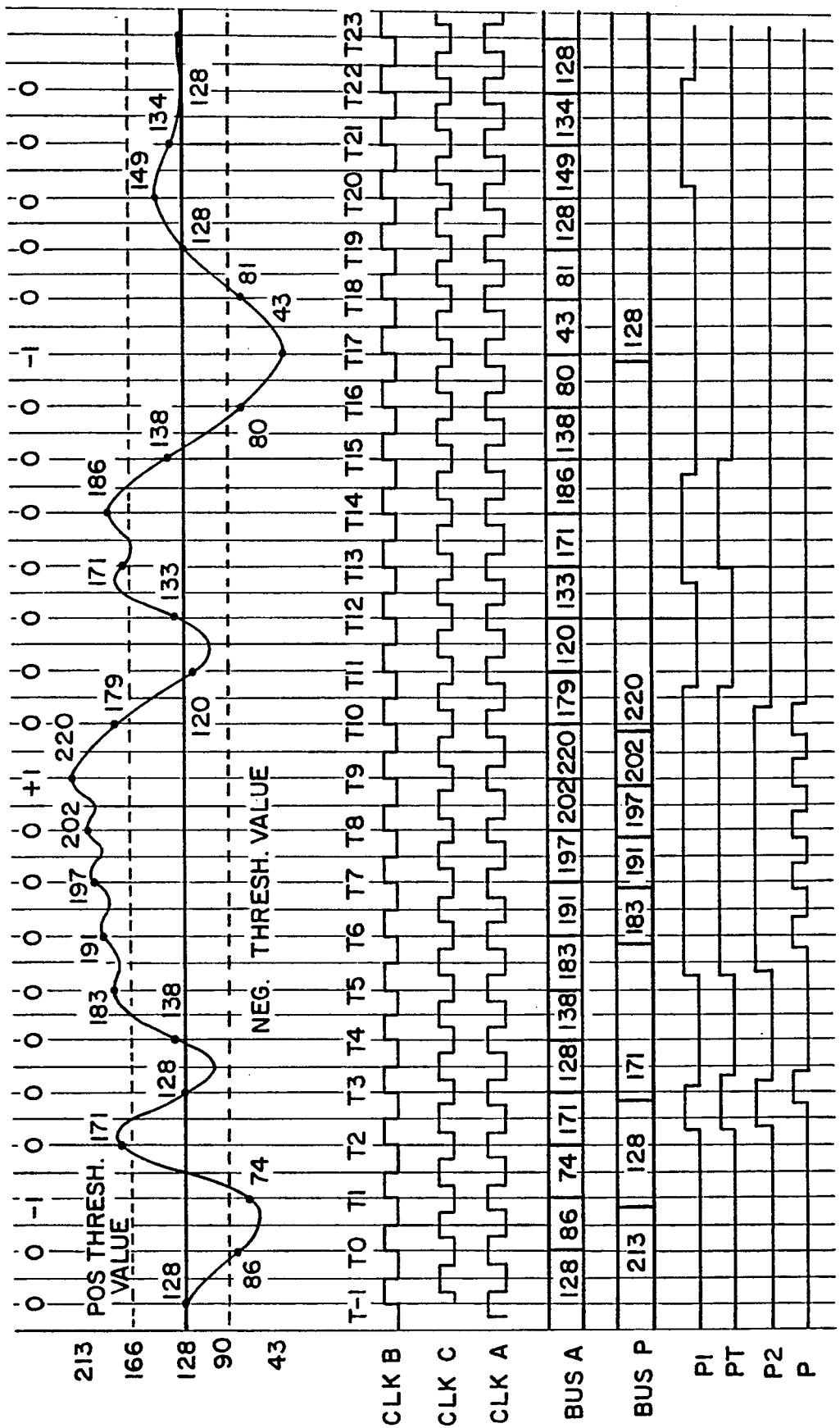
FIGS. 4 and 5, when
Figure 5:
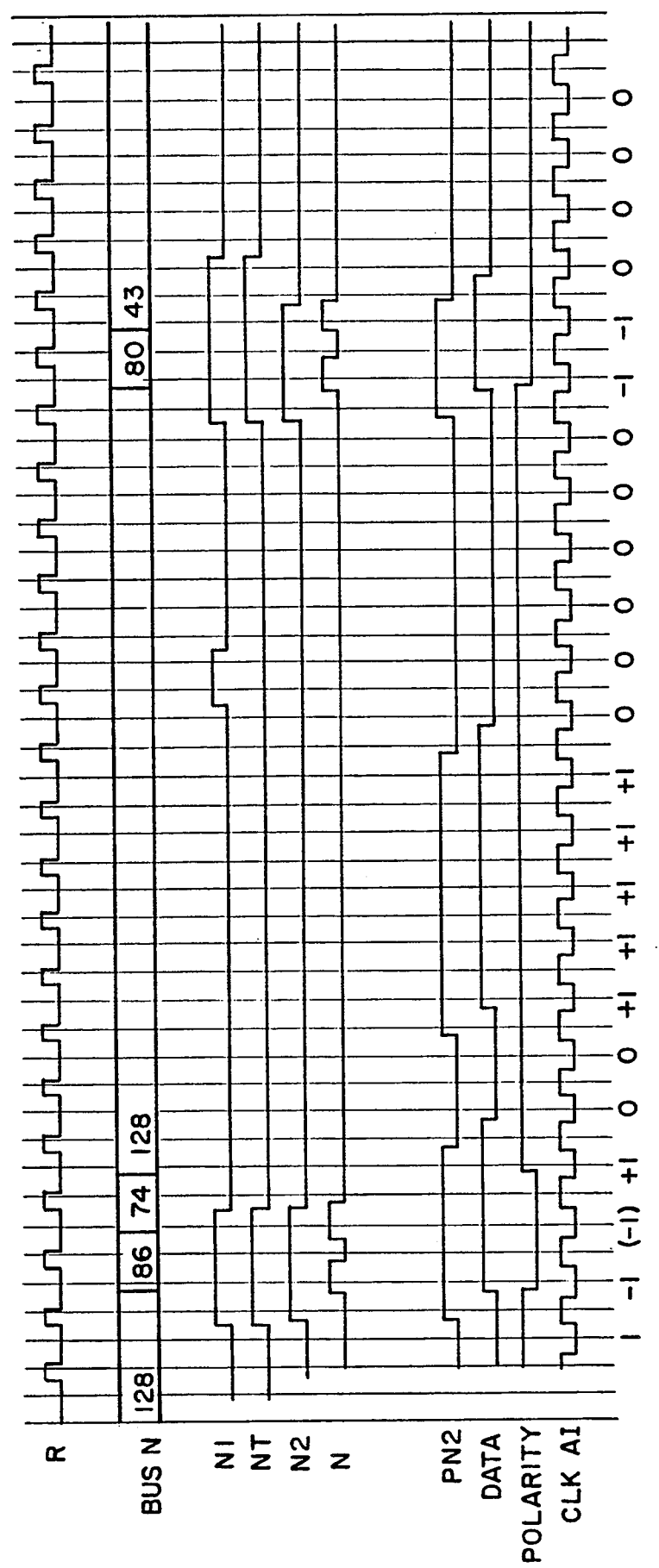

The signal on path 111 contains a number of peaks as shown for the waveform on the top portion of FIGS. 4 and 5. Some of these peaks represent data read from tape 105. Others of these peaks represent unwanted noise, defects in the coating of the tape and other unwanted information. It is necessary in the processing of signal 111 that an output signal be generated that represents only the data originally stored on tape 105 and that eliminates the invalid or unwanted peaks in signal 111. The digital output of the A/D converter 112 is applied over path 119 to the post-peak eliminator 113. The post-peak eliminator eliminates some of these invalid peaks and generates an output signal which is applied over path 120, 121 and 122 to pre-peak eliminator 114. The pre-peak eliminator eliminates the remainder of the invalid peaks contained in the signal it receives and generates an output signal on path 123 that contains only the valid data read from tape 105.

The A/D converter is controlled in part by the clock signals received over path 125 from the clock generator 116. The post-peak eliminator 113 is controlled in part by the clock signals received over paths 125, 126, and 127 from clock generator 116. The clock generator 116 is controlled by the signals applied to path 128 by clock recovery circuit 115.

The digital signals generated by the A/D converter 112 and applied to path 119 are representative of the analog signals on path 111. In performing its function, A/D converter 112 receives over path 111 the analog signals whose amplitude represents the waveform shown on the top portion of this FIGS. 4 and 5. This waveform includes a plurality of peaks some of which represent the valid data stored on tape 105 and others of which represent invalid peaks generated by defects and electrical noise in the reading process including defects on the surface of the tape. All of these peaks appear in the analog signal on path 111 and are converted to a digital value by the A/D converter 112 and applied to its output 119. This output 119 is applied to the pre-peak eliminator 113 and to the timing error detector 117 of the clock recovery circuit 115. The function of clock recovery circuit 115 is to generate a clock signal on path 128 that is twice the frequency of the clock signal that was used by the recording apparatus that originally wrote the data on tape 105. The clock generator 116 divides signal 128 by 2 to produce clock signal 125 that is representative of the clock signal that originally wrote the data on tape 105. Clocks 126 and 127 have the same frequency as clock 125 but are at different phases with respect to clock 125.

The post-peak eliminator 113 receives over path 119 all of the digital signals generated by the A to D converter 112 representative of the analog signals on path 111. The A/D converter 112 generates a digital signal representative of the amplitude of the analog signal on path 111 at each reception of a clock pulse B on path 125. These clock pulses on path 125 appear at the times designated as T-1, T0, T1, T2, ... T23 on the line designated as CLKB on FIGS. 4 and 5. On the waveform immediately above line CLKB on FIGS. 4 and 5, are designated the distal values of the signal generated by the A/D converter 112 and applied to path 119 at each of the clock B times T0 ... T23. The center value of this waveform has a digital value of 128 as indicated by the left-most portion of the analog waveform on FIGS. 4 and 5. A lower or negative threshold value for this waveform has a digital value of 90 while the upper or positive threshold has a digital value of 166. The digital signals generated by the A/D converter whose amplitude falls between the positive and negative thresholds are rejected and not evaluated by either the post-peak eliminator 113 or the pre-peak eliminator 114 for reasons subsequently described. These circuits reject signals that fall between two threshold values and evaluate only signals having peak values exceeding these threshold values.

As already mentioned, the signals on the waveform on FIGS. 4 and 5 contain peaks representing both valid data read from tape 105 as well as peaks representing invalid or spurious signals. On FIGS. 4 and 5, as is subsequently described, the signal peaks representing valid data are the peaks having the digital values of 74 at time T1, 220 at time T9 and 43 at time T17. The post-peak eliminator 113 eliminates invalid peaks which follow a valid peak and are of the same polarity as the valid peak. Thus, on FIGS. 4 and 5, the post-peak signals that are eliminated by the post-peak detector are the signals represented by the digital values 179, 171 at time T13, 186 and 81. The peak signals 179, 171, 186 are post-peaks for the valid peak signal 220. Signal 81 is a post-peak signal to the valid peak signal 43 generated at time T17.

With the elimination of the peak signals 179, 171, 186 and 81, post-peak eliminator 113 applies the remainder of the signals representing peaks as shown on FIGS. 4 and 5 to output path 120 which extends to pre-peak eliminator 114. The data signals appearing on path 120 are shown on the lower portion of FIGS. 4 and 5 on the line designated DATA. Post-peak eliminator 113 applies an output signal to path 121 indicative of the polarity of the data signal applied to path 120. This polarity signal is shown on the lower portion of FIGS. 4 and 5 on the line designated POLARITY. The post-peak eliminator also generates and applies to path 122 a clock signal AI. This signal is indicated on the lower line of FIGS. 4 and 5 on the line designated AI.

The signals ON PATHS 120, 121, 122 are applied to the pre-peak eliminator which eliminates all of the peak signals on path 122 that do not represent valid data read from tape 105. Since the valid data pulses of the signal shown on upper portion of FIGS. 4 and 5 are the peaks having values of 74, 220 and 43, all of the remaining peak signals on path 120 are pre-peaks and are eliminated by pre-peak eliminator 114. The pre-peaks eliminated by the pre-peak eliminator 114 are the peak signals on the top of FIG. 4 having the digital values of 86 preceding valid signal 74 and signals 171 183, 191, 197 and 202 which precede the valid peak signal 220. The next valid data pulse signal is 43 and it has an invalid pre-peak signal of 80 which is eliminated by the pre-peak eliminator 114. The signals appearing between the positive and negative threshold levels on FIGS. 4 and 5 are eliminated by the threshold detector facilities within the post-peak eliminator 113. The output signal generated by the pre-peak eliminator 114 is applied to path 123 and contains only the signals representing valid data peaks. On FIGS. 4 and 5, these three data peak signals are 74 at time T1, 220 at time T9 and 43 at time T17. The pre-peak eliminator 114 also generates a clock signal which is applied over path 124 to a utilization circuit not shown.

Figure 2:
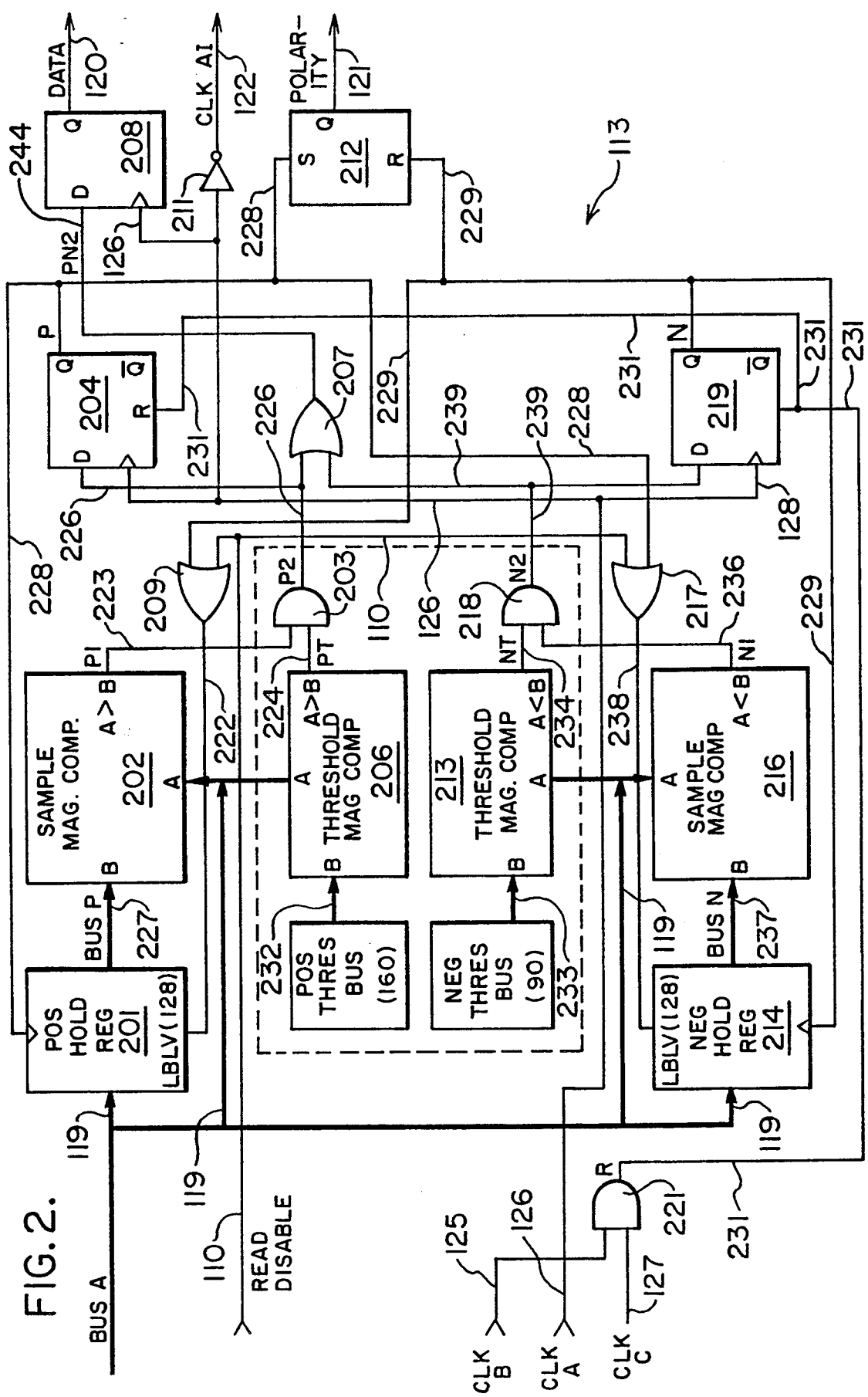
FIG. 2 discloses the details of the post-peak eliminator 113 using fixed thresholds.

The details of the post-peak eliminator are shown on FIG. 2. The following description describes the signals that are applied to the buses A, P and N which are designated respectively as 119, 227 and 237. The following description for FIG. 2 assumes that this circuit is receiving and processing the signals shown for the waveform on the top portion of FIGS. 4 and 5. Bus A is the input of the circuit of FIG. 2 and it receives the digital output of the A/D converter 112.

Clock Recovery Circuit 115

On FIG. 1, the clock recovery circuit 115 receives the digital signals on bus A (119) representing the signal samples generated by A/D converter 112. The timing error detector 117 receives these samples and, in response thereto, generates an output signal on path 129 that controls voltage controlled oscillator 118. The output of oscillator 118 is applied over path 128 to clock generator 116 to generate clock A, clock B, and clock C signals. The clock B signal on path 125 is applied to the lower input of A/D converter 112. By virtue of path 125, timing error detector 117 controls the phase of the signal samples on bus A so that the samples are taken at the peak of the input signals applied in analog form over path 111 to A/D converter 112. The clock recovery 115 including the timing error detector 117 and the VCO 118 function to supply the clock AA signal 128 to the clock generator 116 as shown on FIG. 6. The timing error detector 117 monitors the sampled digital waveform on bus A (119) to ensure that the clock pulses applied to the A/D converter and to the post-peak eliminator 113 are of the proper phase to sample the received waveform. If the timing is slightly off, this is detected by the timing error detector 117 and it issues a correction signal 129 to VCO 118 to correct the phase error so that the clock A, B, and C pulses generated by clock generator 116 are of the proper phase so as to permit the sampling of the digital waveform on bus A with maximum accuracy. Timing error detector 117 is well-known in the art and elements that perform this function are included in many clock recovery circuits.

Clock Generator 116

FIG. 6 shows the details of clock generator of 116 of FIG. 1. Circuit 116 receives pulses on path 128 and, in response thereto, generates the clock A, clock B, and clock C signals on paths 126, 125, and 127. Flip-flops 301, 302, and 303 are toggled by the CLK AA input signal 128. The beginning state of the circuit is shown on FIG. 7 for the line designated CLK A. Flip-flop 301 is in a set state with its Q output high. Upon the reception of the first clock AA pulse on path 128, flip-flop 301 is switched to its opposite state in which its Q output is low and its $\overline{Q}$ output is high. At the reception of this first pulse on path 128, flip-flop 302 is in a set state with its CLK B output high on path 125. The reception of the first pulse on path 128 applies a toggle signal to flip-flop 303 which extends the high on its D input through to its Q output 127 which is a clock C signal. The inversion of the first clock AA pulse on path 128 by invertor 304 applies an inverted low signal to path 306 which does nothing at this time to element 302. A half a cycle later when the first pulse on path 128 goes low, the inverted pulse signal on path 306 goes high to toggle element 302 to extend the low on its D input through to its Q output on path 125. This is the clock B signal.

The rising edge of the pulse on path 128 toggles elements 301 and 303. At this time, element 301 applies a high to path 126 as the clock A signal and element 303 applies a low to its Q output on path 127 as the clock C signal. The flip-flop 302 did not change at time. It next changes on the trailing edge of the second positive pulse on path 306 at time T4. It then applies a high as a clock B signal to path 125. The circuitry works in an analogous manner as shown for the waveforms on FIG. 7 in response to the reception of subsequent clock signals on path 128. All of the clock A, clock B, and clock C signals are one-half of the frequency of the clock AA signal in path 128.

FIG. 2-Fixed Threshold

The starting point for the description of the portion of the circuit of FIG. 2 begins with time T-1 on FIGS. 4 and 5. At time T-1, bus A receives the sample of 128 from A/D converter 112. Let it be assumed at this time that the value of a previously received signal stored in the positive hold register 201 is 213 and that this value is now applied to bus P. Let it also be assumed that the value of the signal in the negative hold register 214 is 128 and that this value is applied to bus N extending to the B input of magnitude comparator 216. Upon the reception of the signal 128 at time T-1, the A input of comparator 202 is 128 and the B input (bus P) is 213. Therefore the condition that A is greater than B is not met and the output of comparator 202 on path 223 remains a low. The A input of comparator 206 is a 128 and its B input is the positive threshold value 166. The condition that A is greater than B is not met and therefore the output of comparator 206 on path 224 remains low. Thus, both inputs of AND gate 203 are now low and it does not turn on in response to the reception of the signal 128.

Comparator 213, on its A input receives 128 and its B input receives 90, therefore the condition that A is less than B is not met and the output of the comparator on path 234 remains low. Comparator 216, on its A input receives a 128 and its B input (bus N) receives a 128. Therefore the condition that A is less than B is not met for this comparator and its output remains a low. Therefore, both inputs of AND gate 218 are now low and it does not turn on.

In summary regarding the reception of the signal 128, none of magnitude comparators 202, 206, 213, or 216 turned on and therefore neither of AND gates 203 or 218 turned on to initiate any further action. Comparator 202 now receives an 86 on its A input and is still receiving a 213 on its B input from positive hold register 201. The condition that A is greater than B is not met and therefore the output of comparator 202 remains low. Comparator 206 now receives the sample signal of 86 on its A input and the positive threshold value of 166 on its B input. The condition that A is greater than B is not met for comparator 206 and therefore its output remains low. Both inputs of AND gate 203 remain low and it does not turn on.

Comparator 213 now receives an 86 on its A input and a threshold of 90 on its B input. The condition that A is less than B is therefore met and its output goes high extending to the upper input of AND gate 218. Comparator 216 now receives an 86 on its A input and a 128 from negative hold register 214 on its B input. Therefore the condition that A is less than B is met for comparator 216 and its output goes high extending to the lower input of AND gate 218. Both inputs of AND gate 218 are now high to turn on the AND gate and drive its output high on path 239. Path 239 extends to the D input of flip-flop 219 and extends through OR gate 207 to the D input of flip-flop 208. The next rising edge of the clock A signal is applied to the clock input of flip-flop 219 to clock the high on its D input through to its Q output on path 229. The same clock A signal is applied to flip-flop 208 to extend the high on its D input to its Q output on path 120 which is the data output line. The high on path 229 from flip-flop 219 re-sets flip-flop 212 to drive its Q output 121 low. Path 121 is the polarity signal output of the post-peak eliminator 113 of FIG. 2. The high on path 229 is also propagated through OR gate 209 to the lower input of positive hold register 201 to re-set it to its baseline value of 128. The high on path 229 is applied to the lower input of negative hold register 214. This enters the sample signal of 86 into the negative hold register 214.

The value of the threshold circuit in the circuit of FIG. 2 can be adjusted by users to produce the optimum error rate for a given situation. Therefore, the negative threshold of 90 and a positive threshold of 166 is shown on FIGS. 4 and 5 are not fixed but can be varied by the user.

The data pulse on path 120 is a peak signal having a digital value of 86 at time T0 as shown on the top portion of FIGS. 4 and 5. As subsequently described, this is not a valid data pulse but instead is an invalid pre-peak pulse. The function of the post-peak eliminator shown on FIG. 2 is to eliminate only post-peak signals representing invalid data and to pass both valid data signals and invalid pre-peak signals.

The resetting of the positive hold register 201 to 128 occurs just prior to time T1 on FIGS. 4 and 5 and is shown on the line designated bus P. The line designated bus A shows the digital values applied to bus A for the circuit operations now being described.

On FIGS. 4 and 5 and with respect to the lines on the bottom portion of the figure designated DATA and POLARITY it can be seen that at time T1, the DATA output line 120 assumes a value of 1 and that the POLARITY line assumes a 0 value. The significance can be observed by looking at the analog waveform at the top of FIGS. 4 and 5 which shows a negative peak, which is an invalid pre-peak, having a digital amplitude of 86. This pre-peak occurred at time T0.

It should be understood that the circuit actions just described regarding the characteristics of the signals applied to DATA conductor 120 and POLARITY conductor 122 represent the signals that were read out of the A/D converter 112 at the clock B time as shown on FIGS. 4 and 5 and applied to the bus A input of the circuitry of FIG. 2. These actions occurred beginning with time T-1 and T0. The circuit of FIG. 2 processed this information and applied it out to the DATA output conductor 120 and the POLARITY output conductor 122 at the leading edge of the clock signal A just before time T1 as shown on FIGS. 4 and 5.

Thus, in summary of the circuit actions described so far, the circuitry of FIG. 2 received the negative pre-peak pulse of 86 at time T0, it applied this digital value of 86 to the A input of magnitude comparators 202 and 216 which compared the digital value of 86 with the digital values in hold registers 201 and 214 which are applied to the B input of magnitude comparators 202 and 216. These comparators perform the logic function of determining whether the value of A is greater than B for comparator 202 and whether the value of A is less than B for comparator 216. The results of the comparison in response to the reception of a digital signal of 86, effects the circuit operation just described which set flip-flops 208 and 212 to apply positive output pulses to DATA output path 120 and polarity output path 121. The signal on DATA path 120 indicates the reception of a pulse signal that exceeds the threshold value. The signal may or may not represent a valid data pulse. The signal now on polarity path 121 indicates that the polarity of the signal 86 is negative.

The rising edge of the clock C pulse occurs just after the time T0. At the same time, clock B is high and the concurrent high state of the clock C and clock B signals turn on AND gate 221. The turn-on of this AND gate resets flip-flop 219 over path 231 and resets flip-flop 204 over path 231 and applies the 231 signal to the R input of flip-flops 204 which was already in a reset state. The re-setting of flip-flop 219 removes the reset signal from flip-flop 212 and, via OR gate 209, removes the LBLV signal from the lower input of positive hold register 201.

The next circuit action of significance occurs on the next rising edge of the clock B signal. This occurs at time T1 as shown on FIGS. 4 and 5. Another data word is then read out of A/D converter 112 and applied over path 119 and bus A of FIG. 2. This word has a digital value of 74 and it is applied to the input of all of the elements on FIG. 2 to which bus A is connected. These are magnitude comparators 202, 206, 213, 216, and hold registers 201 and 214. A digital value of 128 is now on bus P and a digital value of 86 is then on bus N. All of this can be observed in examination of the lines on FIGS. 4 and 5 designated bus A, bus P, and bus N.

Magnitude comparator 213 now receives a digital value of 90 on its B input and a digital value of 74 on its A input. The digital value of 90 represents the negative threshold value shown on FIGS. 4 and 5. The value of the A is less than the value of the B and therefore the output of magnitude comparator 213 goes high over path 234 which extends to the upper input of AND gate 218. Magnitude comparator 216 now receives a digital value of 74 on its A input from the bus A and a digital value of 86 on its B input from the output of negative hold register 214 on bus N. Since the 74 is less than 86, the condition that A is less than B is met and therefore output 236 of comparator 216 goes high extending to the lower input of AND gate 218. Both inputs of the AND gate are now high since the condition that A is less than B is met by both of comparators 213 and 216. AND gate 218 therefore now turns on to drive its output high on path 239 extending to the D input of flip-flop 219. This high also is propagated through OR gate 207 to apply a high to the D input of flip-flop 208.

Comparator 202 is currently receiving a digital value of 74 on its A input from the bus A and a digital value of 128 on its B input from the positive hold register 201.

This makes A less than B which does not activate the output of comparator 202 and leaves its output 223 at a low potential. Comparator 206 is currently receiving a 74 on its A input from bus A and a 166 on its B input from the positive threshold source. A is not greater than B so that the output of the comparator on path 224 remains low.

At the rising edge of clock A just before time T2, flip-flops 219 and 208 are clocked by the clock A signal over path 126 to propagate the high now on their D inputs through to their Q outputs. The high on Q output of flip-flop 208 represents a data pulse on path 120 while the high on the Q output of flip-flop 219 applies a high to path 229 that resets flip-flop 212. This causes the Q output of flip-flop 212 on path 121 to go low indicating that the signal now on path 120 represents a pulse having a negative value. The same signal 229 from the Q output of flip-flop 219 is propagated through OR gate 209 to the LBLV input of hold register 201 to load the baseline value of 128 into it and to cause this baseline value to be applied to bus P.

Signal 229 from the Q output of flip-flop 219 is also applied to the lower input of negative hold register 214 to load the value of 74 now being received on bus A into negative hold register 214. This value of 74 is then applied by the hold register to bus N. The value of 74 is now stored in the negative hold register 214 and applied to the B input of comparator 216. The baseline value of 128 is stored in positive hold register 201. This causes the baseline value of 128 to be applied to the B input of magnitude comparator 202.

At time T2 the circuit of FIG. 2 receives a digital value of 171 on bus A from the A/D converter 112. This value of 171 is applied to all of the elements on FIG. 2 to which bus A is connected as earlier described. Immediately following time T2 and upon the rising edge of clock C both of clocks B and C are concurrently high to turn on AND gate 221. The turn-on of AND gate 221 drives its output high on path 231 to reset flip-flops 219 and flip-flop 204. Flip-flop 204 is already in a reset state. The re-setting of flip-flop 219 drives its Q output low on path 229 which removes the high reset signal from flip-flop 212.

This low signal on path 229 from the queue output of flip-flop 219 is propagated through OR gate 209 to the lower input of the positive hold register 201. This same low signal 229 is applied to the lower input of hold register 214.

At this time we have a binary 171 signal on bus A. This signal is applied to the A input of comparator 202. Comparator 202 now has a 171 on its A input and a 128 on its B input from the output of positive hold register 201. Therefore the condition that A is greater than B is now met and the output of comparator 202 goes high extending to the upper input of AND gate 203. On comparator 206, the A value of 171 is higher than the threshold value of 166 on its B input so that the condition A is greater than B is met. The output of comparator 206 now goes high extending over path 224 to the lower input of AND gate 203. This AND gate is now turned on so that it applies a high to the D input of flip-flop 204. It also propagates this high through OR gate 207 to the D input of flip-flop 208.

Following time T2 and at the rising edge of clock A just before time T3, flip-flops 204, 208, and 219 are clocked by the rising edge of the clock A pulse. The clocking of flip-flop 204 extends the high on the D input of the flip-flop through to its Q output on path 228. The clocking of flip-flop 208 extends the high on its D input to its Q output on DATA path 120. This high indicates a reception of a signal peak on the bus A. The clock A signal is inverted by invertor 211 and applied as a low to the clock AI lead 122 which extends, as shown on FIG. 1, to the pre-peak eliminator 114.

The Q output of flip-flop 204 going high applies a high to the set input of flip-flop 212 to drive its Q output high on POLARITY path 121. This high indicates that the signal on path 120 represents a positive peak.

The high on path 228 from the Q output of flip-flop 204 is propagated through OR gate 217 to the upper input of negative hold register 214 to set it to its baseline value of 128 which is now applied to bus N. The high on path 228 is also applied to the upper input of positive hold register 201 to load the binary value of 171 now on bus A into positive hold register 201. This value of 171 is now applied over bus P to the B input of magnitude comparator 202.

At time T3 the rising edge of clock B applies a sample value of 128 to bus A. This value of 128 is applied to all circuit elements on FIG. 3 to which bus A is connected. Since the currently-sampled signal of 128 is smaller than the value of 171 representing the prior peak on bus P, the value of A is not greater than the value of B, and the output of comparator 202 goes low extending to the upper input of AND gate 203. At this time magnitude comparator 206 is receiving a B value of 166 from the threshold source and a value of 128 on its A input from the A bus. Since the value of 128 for A is smaller than the threshold value of 166 on the B input of comparator 206, the condition A is now greater than B is not met and therefore the output of comparator 206 goes low extending to the lower input of AND gate 203. Comparator 213 has a threshold value of 90 on its B input and a sample value of 128 on its A input. The condition that A is less than B is not met for this comparator and its output stays low. Comparator 216 currently receives a sample value of 128 on its A input and has a value of 128 on its B input. Therefore the condition that A is less than B is not met so that its output remains low. Both signals P1 from comparator 202 and PT from comparator 206 going low cause the output of AND gate to remain low on path 226 extending to the D input of flip-flop 204. Subsequent to time T3, the clock B signal and the clock C signal both being high, turn on AND gate 221 whose output on path 231 going high re-sets flip-flops 219 and 204. The re-setting of flip-flop 219 drives the Q output of flip-flop 219 and flip-flop 204 low, but nothing happens at this time as a result of these Q outputs going low.

Just before time T4 at the rising edge of clock A, the clock A signal on path 126 is extended to the clock input of flip-flops 204 and 219 to clock in the value of the signals P2 and N2 on paths 226 and 239. The value of the signal P2 going into flip-flop 204 is now a low as is the value of the signal N2 going into flip-flop 219. These lows maintain a low on the Q output of flip-flops 204 and 219. Signals P2 and N2 being low extend a low through OR gate 217 to the D input of flip-flop 208. This low is also clocked in by the clock A signal at this time on path 126.

In summary of the above-described action, at time T3, the reception of the signal having a value of 128 on the bus A generated no output on data path 120 since the value of the signal 128 did not activate any of the four comparators 202, 206, 213, and 216, to generate the signals required to apply a high potential to output path 120. Since the signal 128 does not exceed either the upper or lower threshold, the circuitry of FIG. 2 effectively disregards the 128 signal.

At time T4 a signal having a value of 138 is received on bus A and applied to all of the elements to which bus A is connected, namely the four comparators and the two hold registers. The positive hold register 201 is currently storing a signal of 171. The output of comparator 202 stays low at this time since the 138 on its input A is less than the 171 on its input B from bus P. With respect to comparator 206, the 138 now on its A input is less than the positive threshold of 166 applied to its B input and therefore its output on path 224 stays low going to the lower input of AND gate 203. Both inputs of AND gate 203 are now low and its output stays low at this time.

With respect to comparator 216, the 138 on its A input is greater than the 128 on its B input from bus N, its output N1 on path 236 stays low extending to the lower input of AND gate 218. With respect to comparator 213, since the 138 on its A input is greater than the negative threshold of 90 on its B input, the output of the comparator on path 234 stays low going to the upper input of AND gate 218. AND gate 218 does not now turn on and its output remains low. Since the P2 and N2 signals from the output of AND gates 203 and 218 remain low, the clock A signal on path 126 just before time T5 holds the Q output of tip-flops 204 and 219 low. Thus, the reception of the signal 138, which is between the upper and lower threshold, resulted in no output signals being applied to data path 120 representing the reception of a data pulse.

At time T5, as shown on the upper lines of FIGS. 4 and 5, a signal is received having a peak value of 183. This signal is applied over bus A and extended to the four magnitude comparators and two hold registers to which bus A is connected. With respect to comparator 202, the signal 183 on its input A is greater than the signal of 171 on its input B. The output of the comparator goes high extending to the upper input of AND gate 203. With respect to comparator 206, the signal 183 on its A input is greater than the positive threshold signal of 166 on its B input and, therefore, the output of comparator 106 goes high extending to the lower input of AND gate 203. AND gate 203 now turns on and applies a high on its output to the D input of flip-flop 204. The high on the output of AND gate 203 is also extended through the upper input of OR gate 207 to the D input of flip-flop 208. The logic conditions of comparators 213 and 216 are not satisfied since the signal 183 on their A inputs is greater than the signals on their B inputs and therefore their outputs stay low at this time.

At the rising edge of the clock A signal just before time T6, the high on the D input of flip-flops 204 and 208 from the output of AND gate 203 is clocked into the flip-flops to drive their Q outputs high. The high Q output of flip-flop 208 applies a high DATA signal to path 120. The high Q output of flip-flop 204 holds flip-flop 212 in a set condition to hold its Q output high. This high on path 121 indicates that the DATA signal on path 120 is positive.

The Q output of flip-flop 204 going high extends a high through OR gate 217 to the upper input of negative hold register 212. This loads the baseline value of 128 into negative hold register 214 and maintains the value of 128 on bus N extending to the B input of magnitude comparator 216. The high on the Q output of flip-flop 204 is also extended over path 228 to the top input of positive hold register 201 to clock in the value of the signal 183 now on bus A. This signal of 183 is then applied from the output of the hold register 201 and over path 227 to the B input of comparator 202. Thus, at this time, the comparator 202 receives the signal of 183 on its B input while magnitude comparator 216 receives a signal having a value of 128 on its B input.

As a general observation regarding negative hold register 214 and positive hold register 201, they operate in such a manner that when their LBLV input goes high, a baseline value of 128 is loaded into the hold register. They also operate in such a manner that when their clock input goes high, the value of the signal then applied to their left-hand input via bus A is entered into the hold register.

On FIGS. 4 and 5 it can be observed that the waveform now being received has a number of subsequent peaks having successive values of 191, 197, 202, and 220. The peaks having (values) of 183, 191, 197, and 202, are invalid peaks while peak 220 is the peak that represents data read from tape 105. It has just been described how the circuit response to the reception of false peak 183. The circuitry of FIG. 2 operates in a similar manner for the detection of each of the positive peaks 191, 197, 202, and 220. At each such time, the output of comparators 202 and 206 go high since the value A is greater than the value B. Therefore, the output of these comparators turns on AND gate 203 to apply a high to the D input of flip-flop 204 and through OR gate 207 to apply a high to the D input of flip-flop 208. With the arrival of the next clock A signal in which each of these positive peaks is detected, the high on the input of flip-flops 204 and 208 is clocked into these flip-flops drive their Q outputs high. The Q output going high out of flip-flop 208 represents a DATA pulse on path 120 while the Q output of flip-flop 204 going high applies a high to the set input of flip-flop 212 to set it if it was not already in a set condition.

Flip-flops 204 and 219 are re-set by the coincidence of a clock B and clock C signal via AND gate 221 once every clock cycle. This re-sets the flip-flops if they were set. If they were already re-set it does not alter their state. This re-setting is necessary so that each of these flip-flops can be in a position to either be set by AND gate 203 for flip-flop 204 and positive peaks, or by AND gate 218 for flip-flop 219 for negative peaks. Thus, on FIGS. 4 and 5, the circuit of FIG. 2 detects and applies a signal to DATA path 120 for the detection of each of positive peaks 171, 183, 191, 197, 202, and 220. The signal on line 121 at the rising edge of clock AI on line 122 for each such time indicates whether the DATA pulse on line 120 represents a positive or a negative signal.

In view of the above, it can be seen that with respect to the positive peaks beginning with 171 and ending with 220, the circuitry of FIG. 2 passes all of these pulses through to the pre-peak eliminator 114 whose function is to determine which of these signals represents a valid data signal and which are to be rejected as representing invalid data signals.

Following the reception of the signal 220 at time T9, the next signal received is signal 179 at time T10. This signal represents an invalid post-peak which is subsequent to the valid peak of 220. The circuitry of FIG. 2 functions in the manner subsequently described to eliminate the false post-peak signal of 179 so that it is not applied over path 120 to the pre-peak eliminator.

With respect to comparator 202, it now receives a signal of 220 on its B input from the positive hold register 201 and receives the signal of 179 over the A bus on its A input. The logic condition of the comparator is not met since 179 is not greater than 220 and, therefore, the output of the comparator remains low and does not set either flip-flop 204 or 208 at this time. In other words, no new signal is applied to data output conductor 120.

The signal of 120 received on the A bus is rejected at time T11 since it does not exceed the threshold values of 90 or 166. Therefore, no change appears on the output conductors 120 or 121 in response to the reception of the signal 120.

At time T12, the received signal of 133 is rejected since it does not exceed the positive threshold value of 166 or the negative threshold value of 90. Therefore, no change appears in the output signals of the circuitry of FIG. 2 at time T12. Signals 171 and 186, at times T13 and T14, are rejected for the same reason as was signal 179. Both of signals 171 and 186 are invalid post-peaks and it is the function of the circuitry of FIG. 2 to eliminate the post-peaks.

Signal 138 at time T15 does not exceed either threshold value and is rejected for the same reason as was the signal 133.

At time T16, a signal of 80 is received and sent out as a DATA pulse on path 120 in a negative polarity signal on path 121. At time T17 a valid peak having a value of 43 is received and sent out on output conductor 120. The signal 81 at time T18 is an invalid post-peak following valid peak 43 that is eliminated for the reasons analogous to the same as those were for post-peaks 179, 171 and 186. Nothing happens of significance circuit-wise for the remaining peaks shown on FIGS. 4 and 5, namely the peaks of 128, 149, 134, and 128, since none of them exceeds the threshold values.

As a high-level observation regarding FIG. 2, the function of magnitude comparator 206 is to generate an output signal only if a received data signal is positive and exceeds the threshold value of 166. If this threshold value is exceeded, the output of magnitude comparator 206 goes high and applies a high to the lower input of AND gate 203. The purpose of magnitude comparator 202 is to generate an output signal if the value of the signal received on its A input is greater than the value of the positive signal that was previously received and entered into positive hold register 201. If such is the case, the output of the comparator goes high extending to the upper input of AND gate 203. This turns the AND gate on and with the reception of the next clock A pulse, the high on the output of the AND gate 203 is clocked into flip-flop 204 and via OR gate 207 is clocked into flip-flop 208 to generate a DATA pulse. The setting of flip-flop 204 sets flip-flop 212, if it was not already set, and causes a high on polarity path 121. Comparators 213 and 216 operate in an analogous manner for the reception of negative samples with comparator 213 being activated only if the sample exceeds the negative threshold value of 90 and with comparator 216 being activated if the received sample is less in magnitude than the previously detected sample as stored in negative hold register 214.

With regard to sample 220 at time T9, it is entered into positive hold register 201 and applied to the B input of comparator 202. This signal of 220 remains in the hold register 201 for the sample times in which a positive signal of a lesser amplitude namely 179, 171, 186, is received. These lesser signals are rejected because the A input of comparator 202 is not then greater than the magnitude of the B input which is a 220 and, therefore, no output signal is generated by the circuitry of FIG. 2 in response to the reception of these positive signals of a lesser magnitude than 220. It should be noted that at time T16, the reception of the signal of 80 caused the positive hold register to be re-set to its threshold value of 128. It is re-set to this threshold value since the signal of 80 exceeded the negative threshold value of 90. If the signal 80 had not exceeded the negative threshold value, the value of 220 would continue to be held into positive hold register 201. At time T16, positive hold register 201 is reset to its threshold value of 128.

On FIG. 2, as has already been explained, threshold comparators 206 and 213 function in such a manner that they compare the magnitude of a signal on their B input with the signal on their A input to generate an appropriate output signal indicating whether or not the signal on input A is less than the signal on input B. With respect to threshold comparator 206, for example, it compares its A and B inputs and then generates an output of A is greater than B. The output of sample comparator 202 is high when A is greater than B. A is greater than B when the magnitude of a new sample is greater than the magnitude of a previously-received sample stored in register 201. With respect to AND gate 203 and threshold comparator 206, comparator 206 determines whether or not the high output of comparator 202 can pass through AND gate 203 to permit a data pulse to be applied to path 120 and a polarity signal on path 121. The rising edge of clock AI on line 122 tells the pre-peak eliminator when to interpret the signal levels on data line 120 and polarity line 121. Comparator 206 permits these circuit actions to occur in response to a high on the output of comparator 202 if the sample signal received on the A input of the comparator 206 exceeds the threshold value of 166. Conversely, it does not cause the circuit actions to occur if the newly-sampled signal on the A input of comparator 206 is less than the threshold value of 166 on its B input. Comparator 213 works in an analogous manner to enable and let pass through AND gate 218 the output of comparator 216 or, alternatively, not to let the output of comparator 216 pass through AND gate 218.

Figure 3:
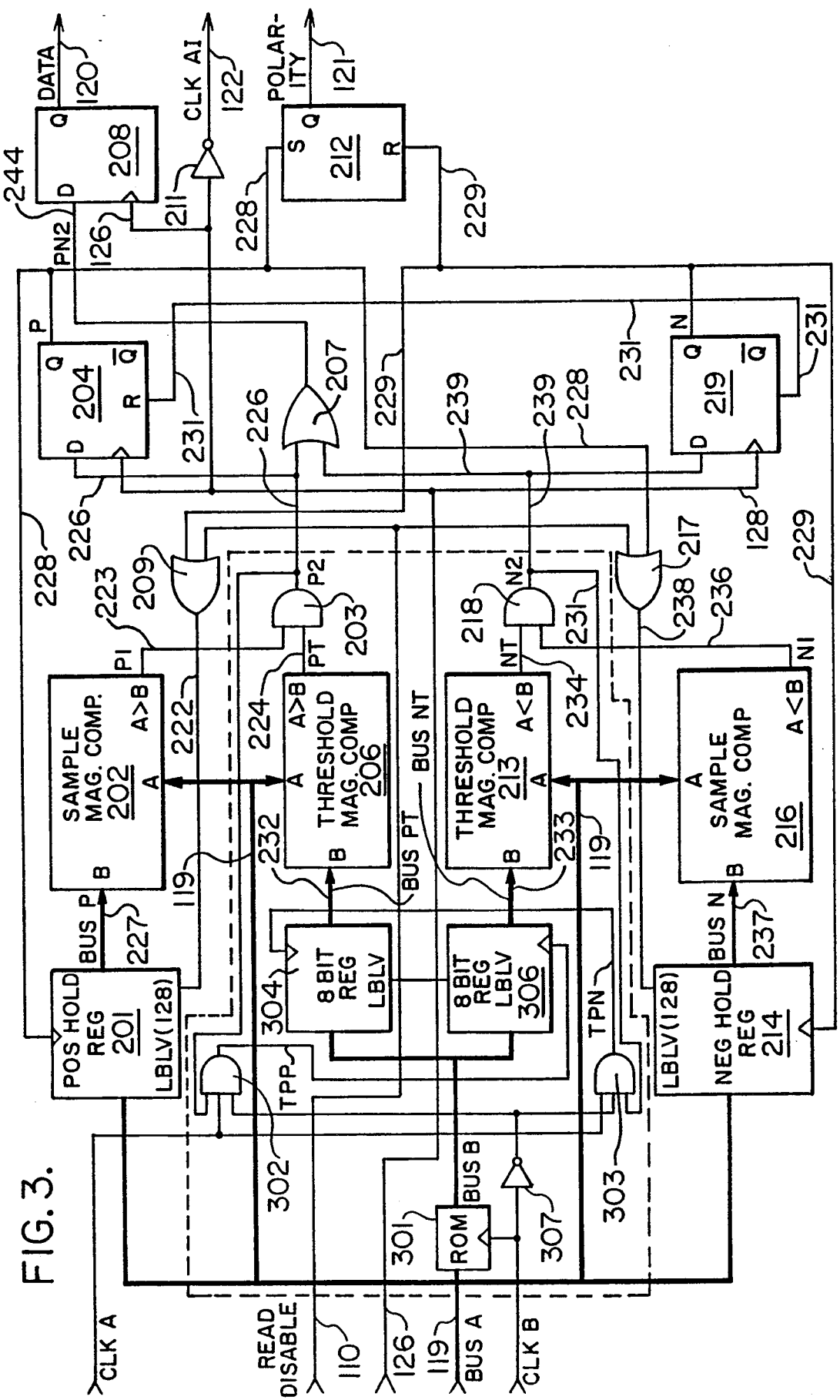
FIG. 3 discloses the details of the post peak eliminator 113 using dynamically variable thresholds.

Variable Threshold FIG. 3

The embodiment of the post-peak eliminator 114 shown in the circuitry of FIG. 2 and in the timing diagrams of FIGS. 4 and 5 operates on the fixed threshold principle with the upper threshold on FIG. 4 being set at 166 and the lower threshold being set at 90. The term "fixed threshold" is used even though the thresholds may be adjusted at any time by the user of the equipment comprising the present invention. Even though the user can make such adjustments, the thresholds are said to be fixed until such time as they are adjusted to new values by the user. The fixed threshold embodiment effectively ignores signal samples that do not exceed the positive or negative threshold values. Such samples are effectively disregarded by the post-peak eliminator 113 which responds only to those signal samples that have amplitudes greater than 166 or less than 90 as shown on FIG. 4. While the fixed threshold embodiment of FIG. 2 performs satisfactorily, there are certain signal conditions in which it can fail to respond to valid signal samples.

Typically, the fixed thresholds are normally set by the user to be about 50 percent of the nominal peak amplitude value for best performance. This means that single polarity noise pulses greater than 50 percent are eliminated as long as they show up as extra peaks in the data stream and are applied to the post-peak eliminator as signal samples. However, if these noise pulses interfere with a valid data peak and appear coincidentally with a valid data peak, they can cause a drop in the amplitude of the valid data peak of greater than 50 percent. In this case, the data peak will not be detected since its amplitude is less than the threshold level of 50 percent. This problem is solved by an alternative embodiment of the invention as shown on the circuitry of FIG. 4 and in the timing diagram of FIGS. 17 and 18.

This alternative embodiment employs dynamically variable threshold amplitude facilities which are based upon the amplitude of the previous opposite peak value that is being held in one of the hold registers 201 and 214 of FIG. 3. The detection of a valid single peak drop-out of greater than 50 percent is improved while still maintaining the performance capabilities of the circuit in rejecting invalid pre-peaks and invalid post-peaks. For example, a previous opposite polarity peak value being set in the hold register that is 70 percent of the nominal peak value sets in the opposite polarity threshold the percentage value of 30. Therefore, overall performance improvement over that of the fixed thresholds is obtained. This is accomplished by replacing the fixed threshold logic of FIG. 2 with the dynamically variable threshold logic of FIG. 3. This allows the threshold values to be updated dynamically each time the opposite polarity peak hold register is updated. The fixed threshold circuitry on FIG. 2 is shown within the dashed lines on FIG. 2 and the circuit elements that are substituted therefor in order to provide dynamically adjustable threshold capabilities are shown within the dashed lines on FIG. 3. With the exception of the circuitry contained within the dashed lines of FIG. 3, the remainder of FIG. 3 including all the elements thereon is identical to that of FIG. 2 and therefore the following description primarily emphasizes the operation of the elements on FIG. 3 that are within the dashed lines rectangle since the operation of the elements on FIG. 3 outside of the dashed rectangle has already been described in detail in connection with the embodiment of FIG. 2.

Figure 17:
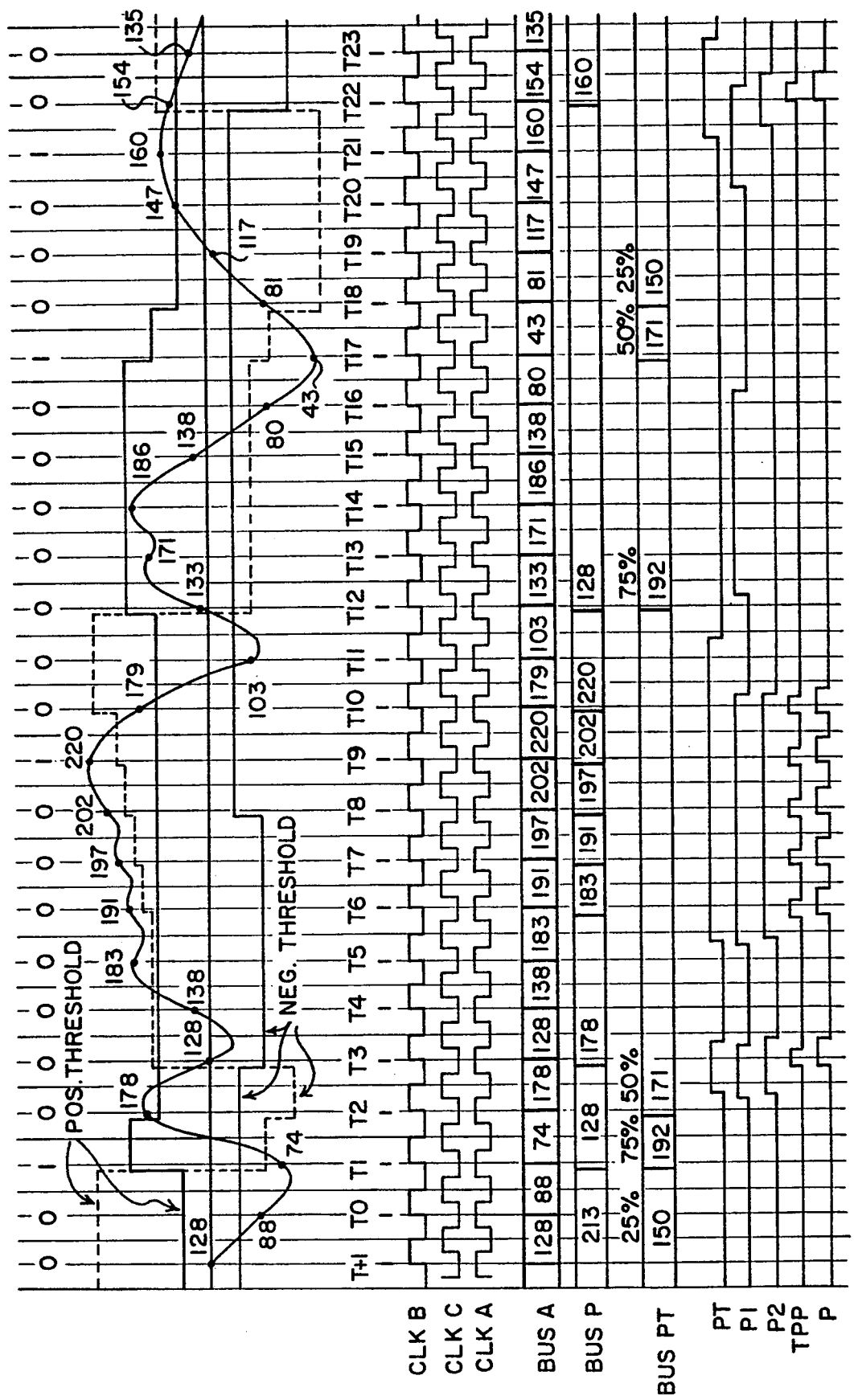
FIGS. 17 and 18, with FIG. 18 being positioned below
Figure 18:
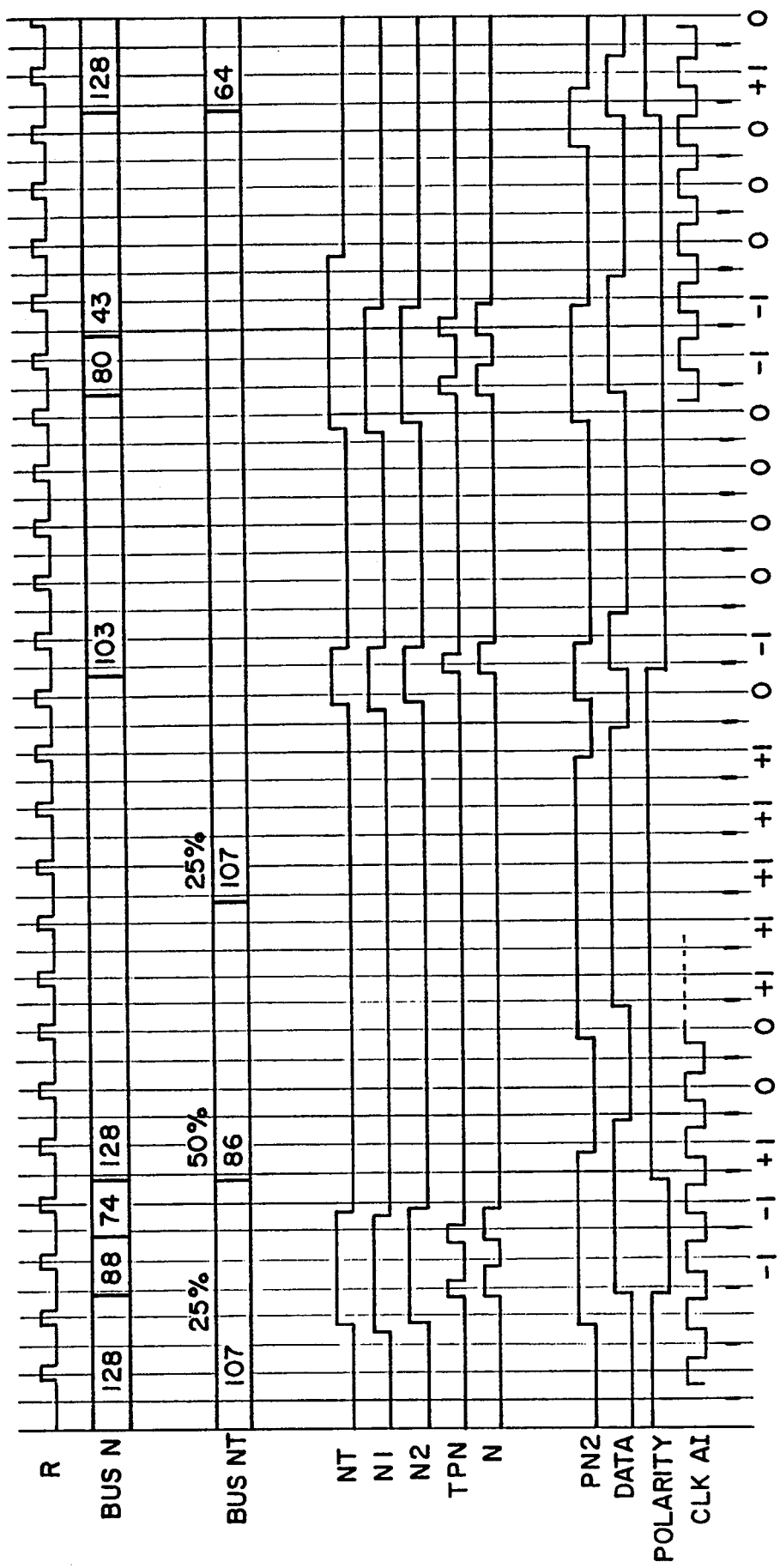

The timing diagrams associated with the variable threshold embodiment of FIG. 3 are shown on FIG. 17 or 18. This timing diagram is similar in many respects to the timing diagram of FIGS. 4 and 5 which have been previously described. Therefore, the following describes in detail only the differences on the timing diagrams of FIGS. 17 and 18 that have not been previously described with respect to FIGS. 4 and 5. The waveforms associated with the received signal samples are shown on the top portion of FIG. 17 and are similar in many respects to the waveform shown on the top of FIG. 4. The digital amplitudes associated with the waveforms on the top of FIG. 17 are shown on the upper left-hand corner of FIG. 17 and vary from a high of 213 down to 43. That means that all digital signals received representing samples and other information read from the tape must have a minimum digital value of 43 and a maximum digital value of 213. 213 is said to be at the 100 percent level. 128 is said to be the center or zero level while 43 is said to be the −100 percent level for signal samples.

The solid line NT on FIG. 17 below the 128 line represents the negative threshold at any given time and it can be seen that this negative threshold assumes different values in accordance with the invention. The top solid line PT above the 128 line represents the value of the positive threshold that in a given instant of time. The dashed line above center line 128 represents the digital value of the signal currently in positive hold register 201. The lines represented by circles below line 128 represent the negative value currently stored in the negative hold register 214. Both the positive hold signal and the negative hold signal can at times assume a value of 128. This is not illustrated on FIG. 17 since it would be too complex. When either of the hold values assume a 128 it is represented by the solid center line of 128 and not by either a dashed symbol for the positive hold value or a circle line for the negative hold value.

Figures 8, 12:
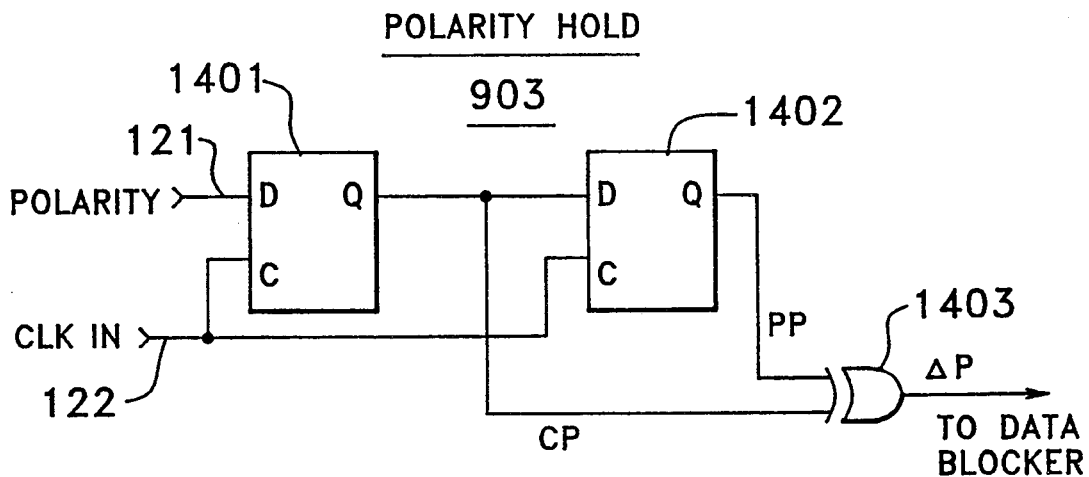
FIG. 8 discloses information regarding ROM 301 of FIG. 3.
FIG. 12 discloses details of polarity hold circuit 903.

FIG. 3 is similar to FIG. 2 except for the subsequently-discussed differences. FIGS. 8 and 23 show two of the many possible ways to load memory, ROM 301, with the threshold values. The memory values loaded per FIG. 8a will be used in the discussion to describe the operation of the dynamically variable threshold embodiments. ROM 301 receives the digital value of each sampled signal on bus A and outputs the signals shown on FIG. 8 for the input addresses with the input addresses represented by the bus A signal. Thus, for bus A signals of zero to 64, the binary output of ROM 301 is 150. This 150 is applied to registers 304 and 306 on FIG. 3. On the timing diagram FIG. 17 the thresholds are altered only when, for example, the sample 43 at time T17 is less than the negative 25% threshold. Also, this is done only if the sample 43 is less than the previous negative sample which in the case of 43 is 80. In that case, the positive threshold is altered and as shown on FIG. 17 it is readjusted to 25% on the following clock A pulse. No threshold updating is done when samples are encountered that are within both thresholds. In other words no circuit actions take place to change anything.

With regard to FIG. 3, the receipt of a binary sample is entered into ROM 301 as a memory address and the information stored in the address memory location is read out and applied to bus B as a potentially new threshold to which the circuit is to be adjusted. Specifically, if the sample on bus A is a negative sample, the information read out of ROM 301 on bus B is a potentially new value for the positive threshold. This is applied to the 8-bit registers 304 and 306. The magnitude comparators 206 and 213 operate in conjunction with the magnitude comparators of FIG. 2 to determine whether, in case of a negative sample, the condition A is less than B is met. If the condition is met, the output of comparator 216 goes high and by means of AND gate 218 goes through AND gate 303 into 8-bit register 304 as the value of the new positive threshold. Similarly, for positive signals.

On FIG. 17, the first sample encountered is 128. At that time, both the positive (PT) and the negative (NT) thresholds are at the 25% level. Next, a signal of 88 is received and after a delay caused by the decision-making time, the positive threshold PT is set to 75% and the negative threshold remains at 25%. Next signal 74 is received and after a decision-making delay, the positive threshold is reduced to 50% and the negative threshold remains at 25%. The reception of the signal 178, after a delay, causes the negative threshold to be reduced to 50% while the positive threshold remains the same. The signals 128 and 138 don't alter the threshold values. The signals of 183 and 191 do not change threshold values.

The reception of the 197 signal leaves the positive threshold PT unchanged but reduces the negative threshold NT to 25%. The signal of 197 causes the negative threshold to be adjusted to 25%. Signals of 202 and 220 leave all thresholds unchanged. The signal of 179 is a post-peak and doesn't alter the thresholds. Signal 103, after a delay, adjusts the positive threshold to 75%. The signals of 133, 171, 186, and 138 are within the thresholds and don't alter either threshold. The signal of 80 readjusts the positive threshold to 50%. The signal 43 adjusts the positive threshold to 25%. The signal 81 is greater than the value of 43 being held in negative hold register 214 and will not alter the positive threshold. The signals 117 and 147 are within the thresholds themselves and don't alter anything. Sample 160 is above the positive 25% threshold and will adjust the negative threshold to 75% and update the positive hold register 201 to a value of 160. Sample 154 is above the positive threshold and below the value of 160 being held in the positive hold register, therefore, no updating of the positive hold register and negative threshold takes place. Sample 135 is within the thresholds and no adjustments take place.

FIG. 3-Variable Threshold

Following is described the operation of the circuitry of FIG. 3 when the threshold logic of FIG. 2 is replaced with the threshold logic of FIG. 3. The elements comprising the threshold logic are shown within the rectangle portrayed by dashed lines on both FIGS. 2 and 3.

The following description makes extensive reference to the positive hold register 201 on FIG. 2 and the negative hold register 214 on FIGS. 2 and 3. Hereinafter these elements are often referred to simply as positive hold register and negative hold register. The following describes the operation of the circuitry of FIG. 3 in response to the reception of the waveform shown on FIG. 17. Prior to time T0, 213 is being stored in the positive hold register. This is indicated by the dashed line PHR on the upper portion of FIG. 17. At time T-1 the signal 128 is received. This signal does not exceed the positive PT or negative NT thresholds and therefore no circuit action is taken. The positive threshold at this time is set at 25% or a digital level of 150 while the negative threshold is set at −25% or a digital level of 107.

At time T0 the negative 88 signal is received. The signal exceeds the negative threshold of 107 on bus NT and stored in the 8-bit register 306. The condition that A is less than B is now met for comparator 213 since the signal value of 88 on the A bus is less than the 107 on the B input from bus NT. Therefore, the upper input of AND gate 218 goes high. The negative hold register 214 is storing a 128. The reception of the signal sample of 88 satisfies the condition that A is less than B for sample magnitude comparator 216. Therefore the condition that A is less than B is met. This drives its output N1 high extending to the lower input of AND gate 218 on FIG. 3. Both inputs of gate 218 are now high and its output goes high extending to the lower input of AND gate 303. The upper two inputs of the AND gate go high on the next rising edge of the clock A signal when the clock B signal is low prior to time T1. AND gate 303 turning on drives its output TPN high extending to the upper input of register 304. This enters into the register the value of the signal now read out of ROM 301. As shown on FIG. 8, the ROM 301 outputs a signal having a binary value of 192 or 75% in response to the signal of 88 on bus A. Thus the value of 192 is now entered into and stored in register 304.

The high signal N2 from AND gate 218 is extended through OR gate 207 to the D input of flip-flop 208. This high on the D input of flip-flop 208 is extended to its Q output as a data signal upon the reception of the next rising edge of the clock A signal prior to time T1. The signal N2 on FIG. 3 also extends to the D input of flip-flop 219 to drive its Q output high upon the next rising edge of the clock A signal prior to time T1. The Q output of this flip-flop 219 going high resets flip-flop 212 if it was not already in a reset position. The reset position of flip-flop 212 holds its Q output low indicating that the signal sample (88) just received is a logical negative peak.

On FIG. 1, the clock B pulse is applied to the A/D converter 112 which in response thereto applies the digital value of the sample signal to bus A 119. On FIG. 3 ROM 301 receives the bus A information when the clock B signal is high. On the trailing edge of the clock B signal, ROM 301 enters the read-out information addressed by the bus A signal to its latch portion where it is stored until the next time ROM 301 is read out.

At time T1 a negative signal of 74 is received and applied to bus A and, in turn, to the magnitude comparators of FIG. 3 and to ROM 301. With respect to the sample magnitude comparator 216 on FIG. 3, the condition that A is less than B is met and its output N1 goes high extending to the lower input of AND gate 218. With respect to the threshold comparator 213, the register 306 is currently storing the negative threshold value of 107 which is applied to the B input of comparator 213. This comparator currently receives the bus A input of 74. Therefore the condition A is less than B is met and the output NT of the comparator goes high to AND gate 218.

Negative hold register 214 is currently storing the previous sample value of 88 which is applied to the B input of sample comparator 216. Comparator 216 now receives the signal of 74 on its A input from bus A. The condition that A is less than B is now met and its output N1 goes high extending to the lower input of AND gate 218. AND gate now turns on and, by means of circuit actions similar to that already described for FIG. 2, in response to the rising edge of clock A applies a high to the data line 120 and a low to polarity line 121. Negative hold register 214 is updated via path 229 (N) with the newly-received sample of 74 on bus A when flip-flop 219 is set in response to the high on the output N2 of AND gate 218.

On FIG. 3, AND gate 218 in turning on applies a high to the lower input of AND gate 303 which turns on upon the next rising edge of clock A while clock B is low. The turn-on of AND gate 303 applies to bus B the information currently read out of ROM 301 in response to the reception of an address signal of 74 from bus A. On FIG. 8 it can be seen that a binary address of 74 causes ROM 301 to read out a binary of 171 as a 50% positive threshold value. This signal of 171 is applied over bus B to the left input of register 304 and is clocked into register 304 by the high on the output of AND gate 303.

ROM 301 may either be a ROM or a RAM memory. ROM memory is suitable for installations in which the information stored is semi-permanent and not subject to frequent changes. On the other hand if, in customer usage, it is desired to give the customer the capability of frequently changing the contents of the memory 201, then a RAM device would be utilized together with the necessary circuitry so that the customer could update or change the information stored in memory 301 as conditions change so that new stored information is desired.

At time T2 a signal having an amplitude of 178 is received on bus A. This signal is applied as address information to ROM 301 to cause it to read out a negative threshold signal of 86. This signal represents the 50% threshold level on the top left-hand portion of FIG. 17, This threshold level of 86 is applied to the left-hand inputs of registers 304 and 306. The positive hold register 201 is currently storing base value of 128 which is applied to the B input of sample comparator 202. At the same time, comparator 202 receives the sample 178 on its A input from bus A. This being the case the condition that A is greater than B is now met and the output of the comparator path 202 on path P1 goes high to the upper input of gate 203. With respect to threshold comparator 206, its B input is now receiving the value of 171 from register 304 and its A input is receiving the sample of 178 from bus A. The condition that A is greater than B is now met and the output of comparator 206 on path PT goes high into the lower input of AND gate 203. Both inputs of AND gate 203 are now high and its output goes high on path P2 which extends to the upper input of AND gate 302. AND gate 302 subsequently turns on when clock A next goes high while the clock B signal is low prior to time T3. The turn-on of AND gate 302 drives its output high on path TPP which extends to the lower input of register 306. This signal on path TPP enters the threshold value of 86 on bus B into register 306 as the new negative threshold value just before time T3.

The turn-on of AND gate 203 applied a high to path P2 which extends to the D input of flip-flop 204 and via OR gate 207 extends to the D input of flip-flop 208. These highs are propagated to the Q outputs of flip-flops 204 and 208 by the rising edge of clock A. The high on the Q output of flip-flop 204 is applied to the set input of flip-flop 212 to drive its Q output high to indicate a positive polarity signal on path 121. The Q output being high on flip-flop 208 applies a high data signal to path 120 to indicate the reception of a positive signal sample. The new threshold values are entered into the threshold registers 304 and 306 just before time T3 with the negative threshold then being at −50% and the positive threshold being at +50%.

The reception of the signal samples 128 and 138 at times T3 and T4 cause no circuit actions of significance since neither of these signal samples exceeds the threshold values. Next, a sequence of positive peaks is received beginning with time T5 and extending through time T9. The reception of the signal 183 at time T5 addresses the ROM 301 on FIG. 3 and as shown on FIG. 8 outputs a negative threshold signal of 86 that is applied to the left inputs of registers 304 and 306. Register 304 is currently storing the threshold value of 171 which is applied to the B input of comparator 206. The signal of 183 on bus A is applied to the A input of comparator 206. This being the case, the condition that A is greater than B is now met for comparator 206 and it drives its output high on path PT. This high extends to the lower input of AND gate 203. The positive hold register 201 is currently storing the value of 178 which is applied to the B input of comparator 202. The A input of the comparator is now receiving the sample of 183. This being the case, A is greater than B and the P1 output of comparator 202 goes high extending to the upper input of AND gate 203. Both inputs of the AND gate are now high to drive its output P2 high which extends to the upper input of AND gate 302. AND gate 302 subsequently goes high upon the next rising edge of clock A when clock B is low prior to time T6. This drives the TPP output of AND gate 302 high extending to the lower input of register 306. This signal TPP clocks the threshold value of 86 on bus B into register 306. This represents no change since the register was already storing a value of 86.

The output of P2 of AND gate 203 going high allows the Q output of flip-flops 204 and 208 to go high from the rising edge of clock A and, in turn, causes the flip-flop 212 to be switched to a set condition in which its Q output is high. The high on the Q output of flip-flop 208 applies a high to data path 120 representing a signal peak while the high on the Q output of flip-flop 212 is a polarity signal on path 121 representing that the peak on path 220 is a positive polarity.

The reception of the signal 183 at time T5 does not turn on comparator 213 since the condition A is less than B is not met. The value A at this time being received is the signal 183 while the B input of the comparator on bus NTT is of the value 86. Therefore A is not less than B and the comparator does not turn and in turn precludes AND gate 218 from turning on. The positive and negative thresholds both remain at 50% for the time being.

Also, the Q output of flip-flop 204 going high, applies a high to the upper input of the positive hold register 201 to enter into it the value of the signal 183 received at time T5 from bus A.

Next, at time T6 the signal 191 is received. The condition A is greater than B is now met with respect to comparators 202 and 206. This being the case, AND gate 203 now turns on to generate a high on data path 120 representing the reception of a signal peak and a high on polarity path 121 indicating that the signal on data path 120 represents a signal of positive polarity. The positive hold register 201 is now updated to store the value of the received signal 191.

The circuit of FIG. 3 operates in a similar manner in response to the reception of the signals 197, 202, and 220, at times T7, T8, and T9, respectively. The reception of the signal 197 causes the ROM 301 to read out a negative threshold of 107 which represents the negative 25% level. This new negative threshold level signal is applied to the left input of a register 306 and is entered into register 306 by the turn-on of AND gate 302 in response to the turn-on of AND gate 203 when comparators 206 and 202 determine that the condition that A is greater than B is now met. The reception of the peak signal 202 at time T8 does not alter either the positive or the negative threshold signal but enters a signal of 202 into positive hold register 201. The reception of signal 220 at time T9 does not affect either of the negative or positive threshold levels, but it does enter the value 220 into the positive threshold register 201. A data signal is applied to path 120 in response to the reception of the signals 197, 201, and 220, and a positive potential is applied to the polarity conductor 121 in response to the reception of each of these signal peaks.

No circuit actions result from the reception of the signal 179 at time T10 since the condition that A is greater than B is not met for sample magnitude comparator 202 since the received sample of 179 on its A input is less than the value of 220 applied to its B input from the positive hold register 201. The signal 179 is therefore eliminated as an invalid post peak.

Next, a signal of 103 representing a negative peak is received at time T11. The reception of this signal causes the ROM 301 to read out a positive threshold signal of 192. Comparators 202 and 206 are not involved at this time since the condition that A is greater than B is not met for either comparator. On comparator 202, the value A from bus A is 103 while the value B from bus P is 220. For comparator 206, the value A is 103 while the value of its B input from bus PTT is 171.

The condition that A is less than B is now met for comparator 213 with the value A being 103 and the value B being 107 from the register 306. Therefore the output of comparator 213 goes high extending to the upper input of AND gate 218. The condition that A is less than B is met for comparator 216. The value of A at this time is a sample of 103 while the value of B at this time is 128 from the negative hold register. Therefore comparator 216 turns on to extend a high to the lower input of AND gate 218 over path N1. AND gate 218 in turning on applies a high to the lower input of AND gate 303 allowing it to turn on at the next rising edge of clock A when the clock B signal is low. The turn-on of AND gate 303 applies a signal over path TPN to clock the new threshold signal of 192 that is read out of the ROM into register 304. This signal of 192 represents the 75% positive threshold level. The turn-on of AND gate 218 also, by means of flip-flop 208, and the rising edge of clock A, applies a high to data path 120 to indicate the reception of a peak and further, by means of flip-flop 219, resets flip-flop 212 to cause the polarity path 121 to go low indicating that the peak signal on path 120 represents a signal of a negative polarity. Thus, at this time the positive threshold is set to the 75% level while the negative threshold remains at the 25% level. The positive hold register 201 by means of flip flop 219 is reset to the value of 128 while the negative hold register 214 is storing a signal of 103 which represents the negative peak received at time T11.

The reception of the signals 133, 171, 186, and 138 results in no significant circuit actions since all of these signals are between the positive threshold of 75% and the negative threshold of 25%.

Next, signal 80 is received at time T16 on bus A. This signal addresses ROM 301 which reads out a positive threshold signal of 171 representing the positive 50% threshold level. This threshold level is entered into register 304 via bus B. Comparator 216 now receives the A signal of 80 and a B signal of 96 from the negative hold register 214 and bus N. Therefore the condition that A is less than B is met for comparator 216. Comparator 213, the condition that A is less than B is met since A equals 80 at this time and B equals 107 from bus NTT. Therefore the output of both of these comparators goes high to turn on AND gate 218. AND gate 303 is allowed to turn on in response to the turn-on of AND gate 218 and the low level of clock B at the rising edge of clock A. The turn-on of AND gate 218, causes a data signal of 1 (a high level) to be applied to data path 120 and a negative polarity signal of 0 to be applied to path 121 indicating that the peak represented by the data signal 120 is a negative peak.

The reception of the signal 43 at time T17 on bus A reads out a positive threshold signal of 150 representing the positive 25% level from ROM 301. This new threshold level is entered into register 306 from bus B. AND gate 218 goes high, turns on and drives its output high since the condition that A is less than B is now met for both threshold comparators 213 and 216. AND gate 303 turns on as previously described after AND gate 218 goes high. The turn-on of AND gate 218, as previously described, causes a data signal representing a signal peak to be applied to data path 120. It also causes a low level potential to be applied to the polarity conductor 121 indicating that the data signal 120 represents a negative peak. The subsequent reception of the signal samples 81, 117, and 147, causes no further circuit actions since all of these signals are within the positive and negative threshold levels.

The reception of the negative signal 43 causes the positive threshold to be set to the 25% level of 150 as shown on the top portion of FIG. 17. The negative threshold remains at the 25% level of 107.

It has already been described how the signals 81, 117, and 147, effect no meaningful circuit action on FIG. 3 since they are within the limits of the positive and negative thresholds. Next, at time T21 the signal 160 is received. This signal exceeds the positive threshold of 150 and therefore the condition that A is greater than B is now met for comparator 202 where A is 160 and B is 128. This condition is also met for comparator 206 where A is 160 while B from bus PTT is 150. Therefore, AND gate 203 now turns on and, as previously described, causes a data signal to be applied to path 120 and further causes a positive polarity indication to be applied to path 121. The reception of the signal 150 causes the negative threshold to be set to the −75% level. The subsequent reception of signals 154 and 135 effect no meaningful circuit action within the circuitry of FIG. 3 since the signals are within the limits of the positive and negative thresholds.

In summary of the variable threshold circuity of FIG. 3 and with respect to the waveform of FIG. T1, it can be seen that the provision of variable thresholds permits the circuitry of FIG. 3 to respond in improved manner to the reception of signals containing both valid data peaks and invalid signal peaks. It should be noted that the signal 160 at time T21 was detected as a valid peak by the circuitry of FIG. 3 and as shown on FIGS. 17 and 18. A comparison of FIGS. 4 and 5 for the fixed threshold embodiment and 17 and 18 for the variable threshold embodiment shows that the reception of a signal of 160 at time T21 on FIG. 4 would have resulted in the signal not having been detected as a valid peak. The reason for this is that the positive threshold value is set at 166 for the embodiment of FIGS. 2 and 4 and therefore any signal less than 166 is effectively eliminated. It is therefore seen that the variable threshold embodiment of FIG. 3 and as shown on FIGS. 17 and 18 have improved performance by permitting the detection of single peak drop outs that otherwise would not be detected by the fixed threshold embodiment. It still maintains the performance capabilities of rejecting invalid pre-peaks and post-peaks.

Pre-Peak Eliminator

Pre-peak eliminator 114 of FIG. 1 is shown on FIGS. 9 through 16 and 19 through 22. This circuit is described with reference to the timing diagram shown in FIGS. 19 and 20. The circuit operation as described assumes that the post-peak eliminator 113 is receiving the waveform portrayed in the upper portion of FIG. 19 and that it applies data pulses 120 and a polarity signal 121 to the pre-peak eliminator representing response of post-peak eliminator 113 to the received waveform containing both valid and invalid peaks. The circuit actions that are described characterize the response of the pre-peak eliminator 114 to the reception by the post-peak eliminator of the signal samples shown on the top of FIG. 19. These signal samples are similar, but not identical, to the signal samples already described in connection with the operation of the post-peak eliminator 113 as portrayed on the timing diagrams of FIGS. 4 and 5 for the fixed threshold embodiment and in FIGS. 17 and 18 for the variable threshold embodiment. The lines on FIGS. 19 and 20 below the waveform on the upper portion thereof indicate the response of various portions of the circuitry of the post-peak eliminator 113 and the pre-peak eliminator 114 to the reception of the signal samples shown on the top portion of FIG. 19. The function of the pre-peak eliminator 114 is to eliminate the false peaks that precede a valid peak. On FIG. 19, peak 74 is a valid peak, and its false pre-peak is peak 86. Peak 220 is a valid peak, and its false pre-peaks are peaks 171, 183, 191, 197, and 202. Peak 43 is a valid peak, and its false pre-peak is peak 80.

Figure 9:
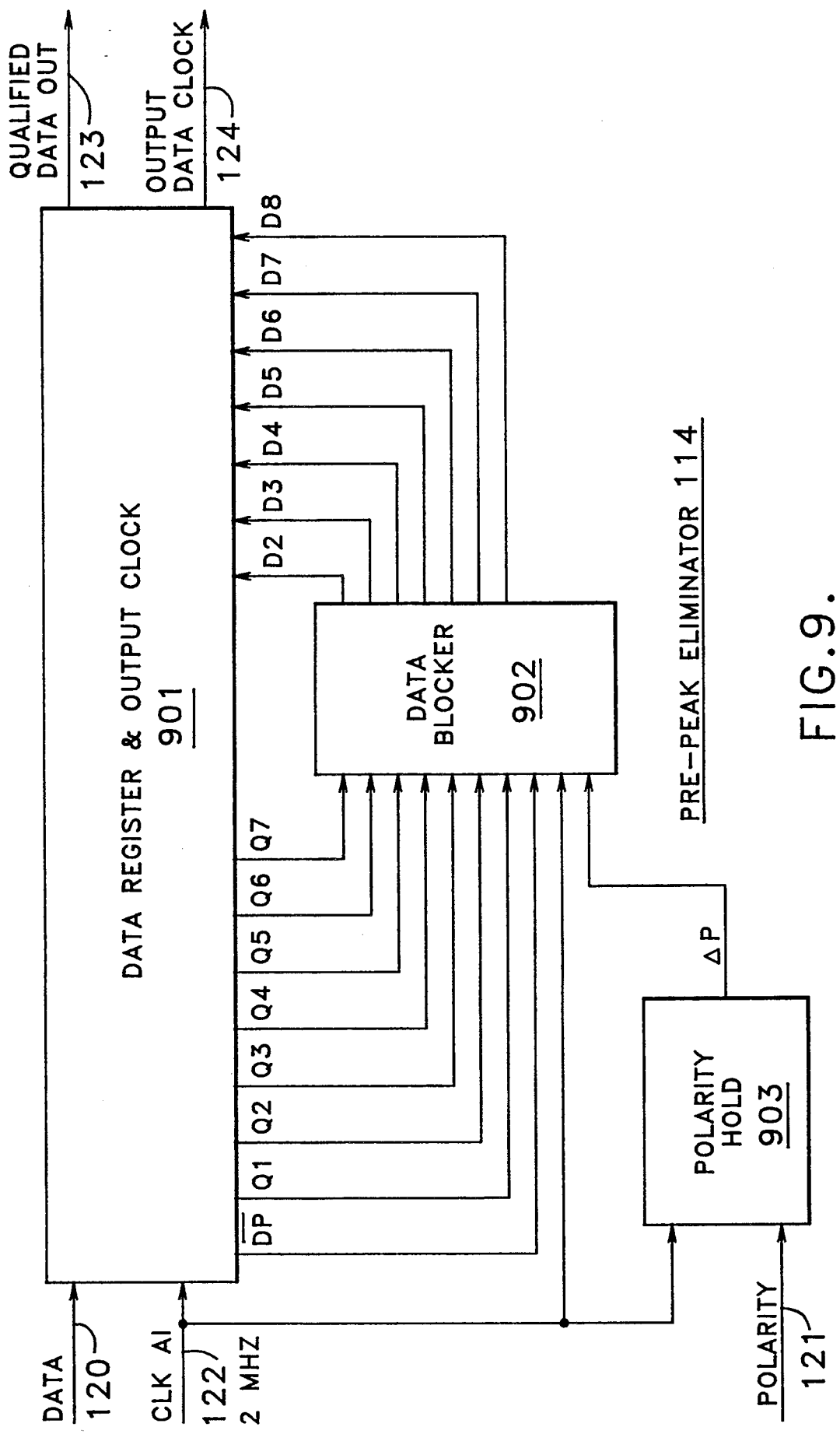
FIG. 9 is a block diagram of the pre-peak eliminator 114.

On FIG. 9 the pre-peak eliminator 114 comprises a multi-stage data register and output clock circuit 901, a data blocker 902 and a polarity hold circuit 903. Data register 901 is a multi-stage shift register. This register is shown in further detail on FIG. 10. The inputs to each stage of the register are designated D- and the outputs of each stage are designated Q-. Conductor D2 is the input conductor to the register stage FF2 on FIG. 10. Conductor Q1 is the output conductor of the FF1 stage. The data blocker 902 controllably either interconnects or isolates the output conductors of a register stage with the input conductor of the following register stage. For example, data blocker 902 can controllably block the output signal on conductor Q1, which is the output of register stage FF1 as shown on drawing FIG. 10 and cause it to be applied or not applied to input conductor D2 which is the input conductor to the D input of register stage FF2.

The function of the polarity hold circuit 903 is to detect a change in polarity of the polarity signal 121 received from the post-peak elimination 113. The input and output conductors of the pre-peak 114 eliminator shown on FIG. 9 are numbered in identical manner so as to facilitate a correspondence with the input and output conductors of the pre-peak eliminator 114 as shown in block diagram FIG. 1.

The pre-peak eliminator of FIG. 9 receives (from post-peak eliminator 113) three signals designated data 120, polarity 121 and clock AI 122. A clock signal is received on path 122 repetitively at pre-determined intervals determined by the system clock. The data path 120 on FIG. 9 receives data signals from post-peak eliminator 113. Each data signal 120 is received coincident with the clock AI signal and may either be a 0 (low) or a 1 (high). It is a 0 if the post-peak eliminator has not detected a signal peak sample that exceeds the positive or negative threshold of the post-peak eliminator. The data signal 120 is a 1 if the post-peak eliminator has detected a signal sample that exceeded the threshold and that may or may not comprise a valid data peak. The polarity signal 121 received from the post-peak eliminator 114 indicates whether or not the data signal currently on data lead 120 represents a positive or negative signal sample as received by post-peak eliminator 113. The polarity signal 121 is a binary 0 (low) if the data signal 120 represents a negative signal sample. The polarity signal 121 is a 1 (high) if the data signal 120 represents a positive signal sample. Clock signal 122 synchronizes the operation of pre-peak eliminator 114 and advances the data within register 901 from stage to stage. It also controls the operation of polarity circuit 903 and data blocker 902. The pre-peak eliminator 114 eliminates the false peaks that precede a genuine peak and outputs only data pulses representing valid peaks. The waveform on the upper portion of FIG. 19 portrays the signals that are applied by the A/D converter 112 to the post-peak eliminator 113. The function of the post-peak eliminator is to eliminate the false peaks that follow a valid peak. Thus, for example, on FIG. 19, sample 220 is a valid peak while the following received samples 179, 171, and 186, are false post peaks. These false post peaks are eliminated by the post-peak eliminator 113 and not applied over data path 120 to the pre-peak eliminator. Thus, the pre-peak eliminator does not receive a binary 1 on data path 120 at the sample times associated with the samples 179, 171, and 186 that follow sample 220. The output of the pre-peak eliminator is applied as a qualified data out signal on path 123. It also applies an output data clock to path 124.

The function of the polarity hold circuit 903 on FIG. 9 is to provide an output signal ΔP to data blocker 902 representing a change in the polarity of the polarity signal on path 121.

The function of data register and output clock circuit 901 on FIG. 9 is to register and advance both valid peaks and false pre-peaks until the data blocker circuit 902 on FIG. 9 determines whether the signal represents a valid peak or a false pre-peak. The output of each register stage is designated Q- such as Q1 for register stage FF1. The input for each register stage is indicated by the D-conductors. Under circumstances in which no blocking takes place by data blocker 902, the output of a register stage, such as FF1, is applied over path Q1 and goes through data blocker 902 and is applied to the D input of the next register stages, such as register stage FF2. Each of the register stages comprises a flip-flop. The first register stage is FF0, the next register stage is FF1 while the last register stage is F9. The output of register stage FF0 is designated DP and it is permanently extended to the D input of flip-flop FF1. The output of stage FF8 is Q8 and is permanently connected to the D input of flip-flop FF9. The outputs of each of the register stages comprising flip-flops FF1 through FF7 is connected via the data blocker 902 to the next register stage.

The function of the data blocker, as subsequently described, is to controllably block or not block the Q-signal it receives from the outputs of the various register stages. If the blocker 902 is in a blocking mode, a Q-signal is not then applied to the D-conductor extending to the next register stage. The controllable blocking function of data blocker 902 is subsequently described in detail.

When data blocker is normally in a non-blocking mode, register 901 operates as a conventional shift register in response to the reception of each clock pulse on path 122. The information in each register stage is then propagated forward to the next register stage upon the reception of a clock pulse. The data blocker is always active and, in response to each concurrent receipt of a signal on data path 120 and a clock pulse on path 122, it makes a conscious determination as to whether it should perform a blocking function. In other words, upon the concurrent reception of each data signal on path 120 and clock pulse on path 122, the data blocker 902 determines whether the data pulse received on path 120 is a false pre-peak or whether it represents a genuine data peak signal. If the data pulse represents a genuine peak, it is advanced to the next register stage; if it is not genuine, the data blocker 902 precludes the appearance of the pulse on the output path 123 as subsequently described.

The circuitry of FIG. 9 receives each clock AI signal on path 122 and applies it to the clock input of each flip-flop. It also applies it to inverting amplifier 1002 which applies an inverted output clock signal to path 124. A high on path 120 represents a data peak, and it is applied to the D input of flip-flop FF0 on FIG. 10. This signal is propagated from stage to stage within the register and ultimately appears on the output of the register on path 123 if the signal represents a valid peak of either a positive or a negative polarity. The advancement of each data signal 120 continues within the register as long as the data blocker has not yet determined that the signal represents a false pre-peak. A signal is effectively eliminated and is precluded from advancement by the data blocker as soon as the controlling logic associated with the data blocker 902 determines that the signal represents a false pre-peak. At that time it is blocked and prevented from passing to the D input of the next register stage. This effectively eliminates and erases the signal from the contents of the shift register. On the other hand, data signals 120 within the shift register continue their advancement upon the reception of each clock pulse on path 122 and ultimately reach the output path 123 if the logic circuitry associated with data blocker 902 determines that they represent valid peaks. Data signals that represent valid data peaks pass through the register unblocked and ultimately appear on output path 123. Data signals 120 that are applied to the data input 121 of the register but which represent false pre-peaks advance within the register only until the controlling logic associated with the data blocker 902 determines that the signals represent false peaks. At that time they are eliminated and precluded from advancing to the next register stage.

FIG. 11 shows data blocker 902 as comprising a block state machine 1101 and block logic 1102. Block state machine 1101 operates as subsequently described to control the operation of the block logic 1102. The lower inputs to block logic 1102 are the Q-conductors from the outputs of the register flip-flop on FIG. 10. These Q-input signals are controllably blocked or not blocked by block logic 1102. They are either applied or not applied to the D-input conductors of the register flip-flops on the right side of block logic 1102. The left inputs to block logic element 1102 are designated $Z_0$ through $Z_6$. The potentials applied to these Z-conductors control the operation of the block logic element 1102 to permit it to perform a blocking or non-blocking operation.

The block state machine 1101 comprises next state element 1103 and data logic 1104 together with flip-flops $Q_A$, $Q_b$, and $Q_c$ which interconnect the outputs of next state element 1103 with the inputs of data logic 1104.

Figures 13, 14:
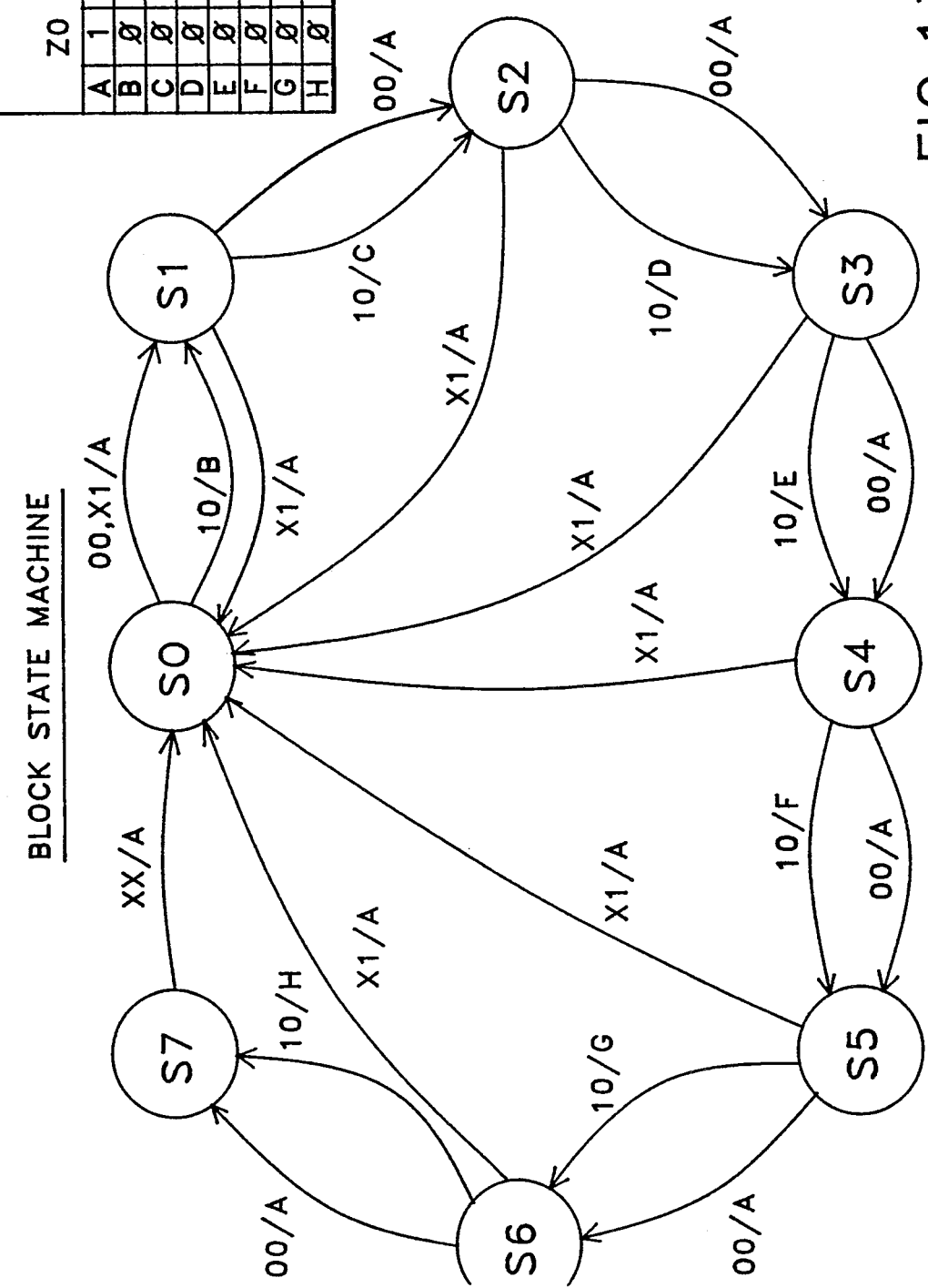
FIG. 13 discloses the status of block state machine 1101.
FIG. 14 discloses the blocking patterns for data blocker 902 of FIG. 9.

FIG. 13 indicates the various states (S0 - - - S7) that may be assumed by the block state machine 1101 of FIG. 11. The various states are interconnected by lines with arrows indicating the direction of state movement. Thus, for example, the machine may go from state S0 to state S1 over two separate paths and may return from state S1 back to state S0 over a single path. Each path is designated in a manner that indicates the input signals of FIG. 9 to which the state machine responds and the filtering pattern used by the state machine in responding to the input signals and moving from a first state to a second state. Thus, for example, the top line interconnecting state S0 and state S1 is designated 00, X1/A. This symbology indicates that in response to input signals of 00 or X1 (where X=don't care) the block logic machine 1101 of FIG. 11 will assume a filtering state of A and, after the clock pulse is received, will transition from state S0 to state S1. With respect to the symbols 00, the first 0 represents the data input signal DP and the second 0 represents the polarity signal $\Delta P$. The first 0 represents a low data input signal 120 which represents no sampled data peak. The second 0 represents a no-change in the state of the polarity signal $\Delta P$. Symbol X1 equals 01 and 11. The first symbol indicates the state of the data input signal DP while the second symbol of 1 indicates a high on the polarity signal $\Delta P$. The high represents a change in state of the polarity signal $\Delta P$. The 1 represents a change in state from the output of the polarity hold circuit 903 on FIG. 12 with the input of the polarity hold circuit being the polarity path 121. Path 121 can be either a high or a low depending upon the value of the polarity output signal from the post-peak eliminator 113 of FIG. 1.

The symbol/A on FIG. 13 indicates the filtering pattern shown in FIG. 14 where the filtering pattern A is shown on the top line and indicates that the value of all of conductors $Z_0$ through $Z_6$ on FIG. 14 is a 1. The conductors $Z_0$ through $Z_6$ are ANDed with the conductors Q1 through Q7 going to the input of the data blocker 902 on FIG. 11 so as to perform the AND function shown in the Boolean equations on FIG. 16. On FIG. 16 it can be seen that an output signal of D2 is generated upon the reception of input signals of Q1 and Z0. In other words signal D2 is a 1 when signal Q1 is a 1 provided that signal $Z_0$ is a 1. The filtering pattern of A causes all Z-conductors to go high which permits the signals on input conductors Q1 through Q7 to pass through block logic 1102 of FIG. 11.

In summary of the above it can be seen that the block state machine 1101 of FIG. 11 responds to an input signal on FIG. 1 of either 00, 01 or 11 and, in response thereto, does not perform a blocking function and permits all of the signals applied by the Q-conductors to the lower portion of the block logic 1102 to pass and be applied to output conductors D2 through DS. In response to the reception of any of these input signals of 00, 01 or 11, the machine performs as above-indicated and, after the clock pulse, advances to state S1. The machine could have similarly advanced from state S0 to state S1 with a blocking pattern of B in response to the signals 10 where the 1 represents a high for the data input signal DP and the 0 represents no change in the polarity from the A P output of the polarity hold circuit 903 on FIG. 9. The blocking pattern of B is shown on FIG. 14. For pattern B, conductor $Z_0$ is a 0 which blocks the signal Q1 that is applied to the lower input of the block logic 1102. The other Q-signals are not blocked and pass through to output conductors D3 through D8. However, output conductor D2 remains a 0 because of the blocking pattern of B.

Once in state S1, the block state machine 1101 of FIG. 11 may alternatively return to state S0 or it may advance to state S2. This is shown on FIG. 13. If a change in polarity of the $\Delta P$ signal of FIG. 9 is detected, the machine returns from state S1 back to state S0 over the path designated X1/A. The A in this symbol represents the blocking pattern A shown on FIG. 14. The X1 portion of the symbol represents respectively a low or high data input signal DP followed by a high polarity change signal ΔP. The X represents a don't care and thus symbol X1 represents the two symbols 01 and 11. In other words, regardless of the value of the signal on the data input line DP, the reception of a 1 for a ΔP polarity change signal causes the machine to return to state S0 from state S1. It should further be observed that regardless of what state, other than S0, the machine is in, the reception of an X1 signal causes the machine to return with a blocking pattern of A back to state S0. This is indicated by the lines leading to state S0 from all of states S1 through state S6. The machine always returns to state S0 following S7 regardless of the signal received.

With respect to state S1, it has already been mentioned that the machine returns to state S0 upon the reception of a polarity change signal ΔP. Alternatively, the machine may advance from state S1 to state S2 with a blocking pattern of A in response to the reception of a 00 signal or may advance to state S2 with a blocking pattern of C in response to the reception of a 10 signal for the data input signal DP and the ΔP signal.

In a similar manner the machine may advance to other states in response to the reception of the signals shown on FIG. 13. As long as the input signals remain 00, the machine uses the blocking pattern of A and advances sequentially from state S1 to state S2 and so on to state S7 and then returns to S0 regardless of the input signals received. With the blocking pattern of A, the data register 901 performs as a conventional shift register and the signals applied to its input on path 120 ripple forward in the register, stage by stage, in response to the reception of each clock pulse. No blocking is performed by the block logic element 1102 of FIG. 11 for this A blocking pattern Under such conditions, each signal applied to the input line 120 advances within the register 901 of FIG. 9 and appears on data output path 123.

The input signal pattern 10 for data input line DP and the ΔP signals causes the machine to advance sequentially from state to state under control of clock pulses 122 on FIG. 9 as long as signal condition 10 persists. The machine advances from S0 to S1 with a blocking pattern of B for this 10 signal and then can sequentially advance to the other states such as S2, etc. The machine advances from state S1 to state S2 with a blocking pattern of C and from state S2 to state S3 with a blocking pattern of D. It further advances sequentially to the other states for this 10 signal pattern with indicated blocking patterns of E, F, G, H, and then returns to state S0 from state S7 regardless of the nature of the input signals received. The blocking pattern of B effectively eliminates the Q1 signal. The blocking pattern of C uses the Z0 and Z1 signal to block the signals Q1 and Q2. In a similar manner, the blocking patterns of D, E, F, G and H block the Q-signals indicated by the Boolean tables of FIG. 16 and as shown on FIG. 14.

The present invention uses the blocking patterns shown in the table on FIG. 14 to eliminate the false pre-peaks preceding a valid data peak. The block state machine moves from state to state in response to the reception of every clock signal on path 122. It doesn't matter whether a 1 or 0 signal is applied to the data input 120. Irrespectively, the state machine moves from state to state in response to the reception of every clock pulse and makes a decision as to whether or not to perform a blocking operation.

The QA, QB, QC flip-flops on FIG. 11 within the block state machine 1101 receive the outputs of the next state element 1103 of FIG. 11 and, in response thereto, control the current state of the block state machine 1101. The state information for the three flip-flops is shown in the equations designated S0 through S7 on FIG. 22 where state S0 is represented by a signal 000 from the Q-outputs of the three flip-flops. The output signals for the remaining states S1 through S7 are indicated in this set of equations on FIG. 22. The output signals Q and $\overline{Q}$ of each of these flip-flops are applied to data logic 1104 of FIG. 11. Data logic 1104 also receives the ΔP and $\overline{DP}$ signals. In response to the reception of these signals, it generates the signals $Z_0$ through $Z_6$ which are applied to block logic 1102 of FIG. 11. The Boolean equations characterizing the operation of data logic 1104 is shown on FIG. 15.

The next state element 1103 of FIG. 11 generates output signals A+, B+ and C+ which are extended to the D inputs of flip-flops QA, QB, and QC. These output signals are generated in response to the reception of the ΔP signal and the signals on the outputs of these three flip-flops. The Boolean equations characterizing the operation of the next state element 1103 of FIG. 11 are shown in FIG. 21.

The polarity hold 903 circuit of FIG. 9 is shown on FIG. 12. This circuit comprises clocked flip-flops 1401 and 1402 whose Q outputs are applied to exclusive OR gate 1403. The D input to flip-flop 1401 is the polarity signal 121 of FIG. 9. As long as this polarity signal remains unchanged, the Q outputs of flip-flops 1401 and 1402 are of the identical polarity and the exclusive OR gate 1403 generates a low output signal ΔP since its inputs are of the same polarity. However, when a changed polarity signal 121 is received, the Q output of flip-flop 1401 differs from that of flip-flop 1402 so that exclusive OR gate 1403 receives input signals of a different polarity and generates a high for ΔP output signal.

The following describes the philosophy upon which the pre-peak eliminator is based. The design of the circuit as shown was formulated to handle the 1,7 code. The algorithm can be changed to handle other codes as understood by those skilled in the art. The algorithm incorporates the following factors. First, the maximum length between two valid data pulses is eight bit cells. The logic value of the polarity signal is not used. Only the fact that it is changed as indicated by a high ΔP signal. A logic 1 on the data input 120 represents a data pulse from the post-peak eliminator circuit 113 of FIG. 1. Given a random data stream of a given polarity, the last data pulse received on path 120 is assumed to be the valid data pulse in the sequence. All other prior pulses are assumed to represent invalid pre-peaks and are eliminated.

Figure 10:
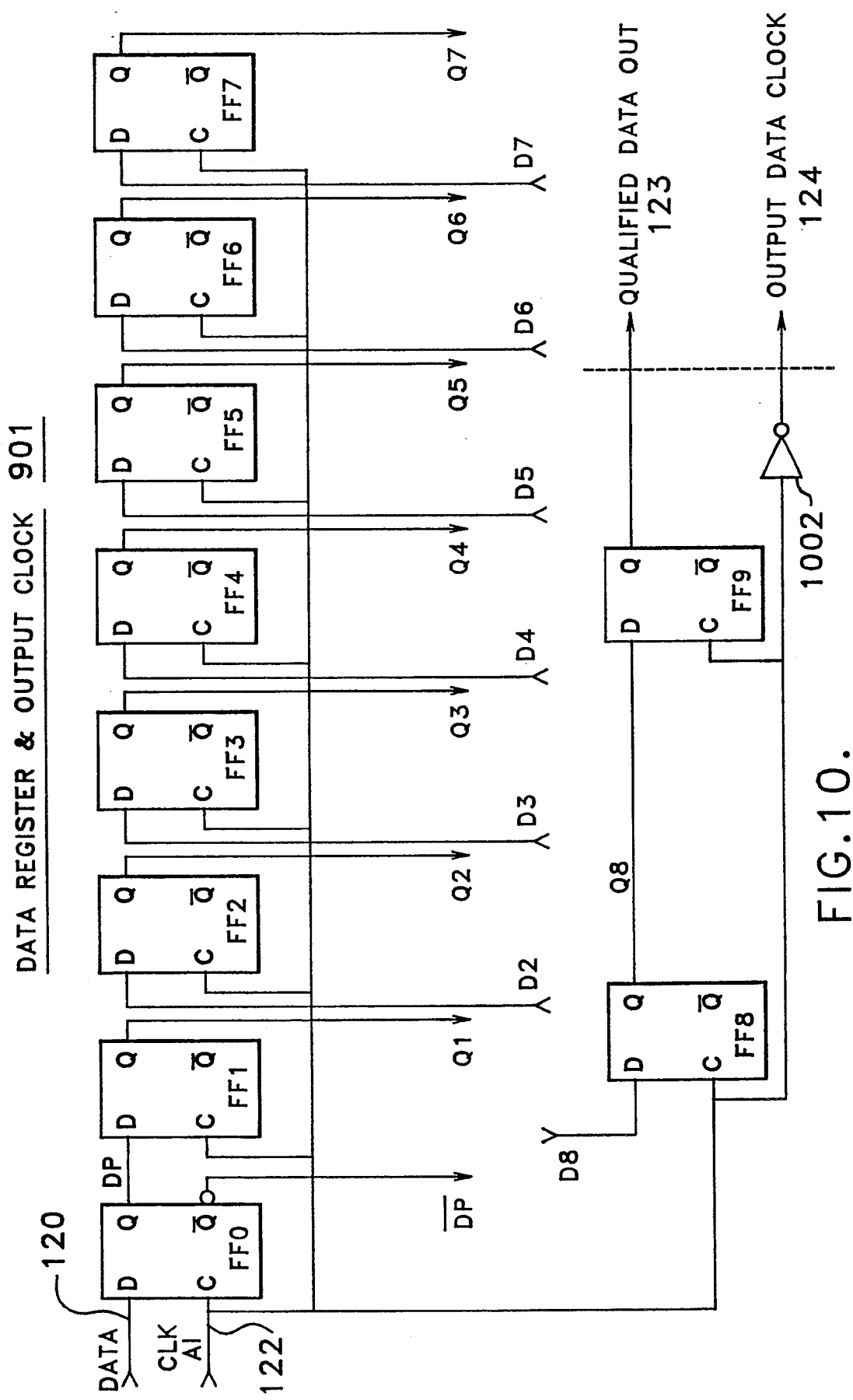
FIG. 10 discloses details of data register and output clock of FIG. 9.

The purpose of flip-flop FF0 on FIG. 10 is to latch data pulses received on path 120 and present their inverted value $\overline{DP}$ to the block state machine 1101 of FIG. 11.

The purpose of polarity hold element 903 in FIG. 12 is to latch the polarity signal received on path 121 and generate a change in polarity signal ΔP which is presented to the block state machine 1101 of FIG. 11.

The block state machine transitions to another state on each clock pulse received over path 122.

Figure 19:
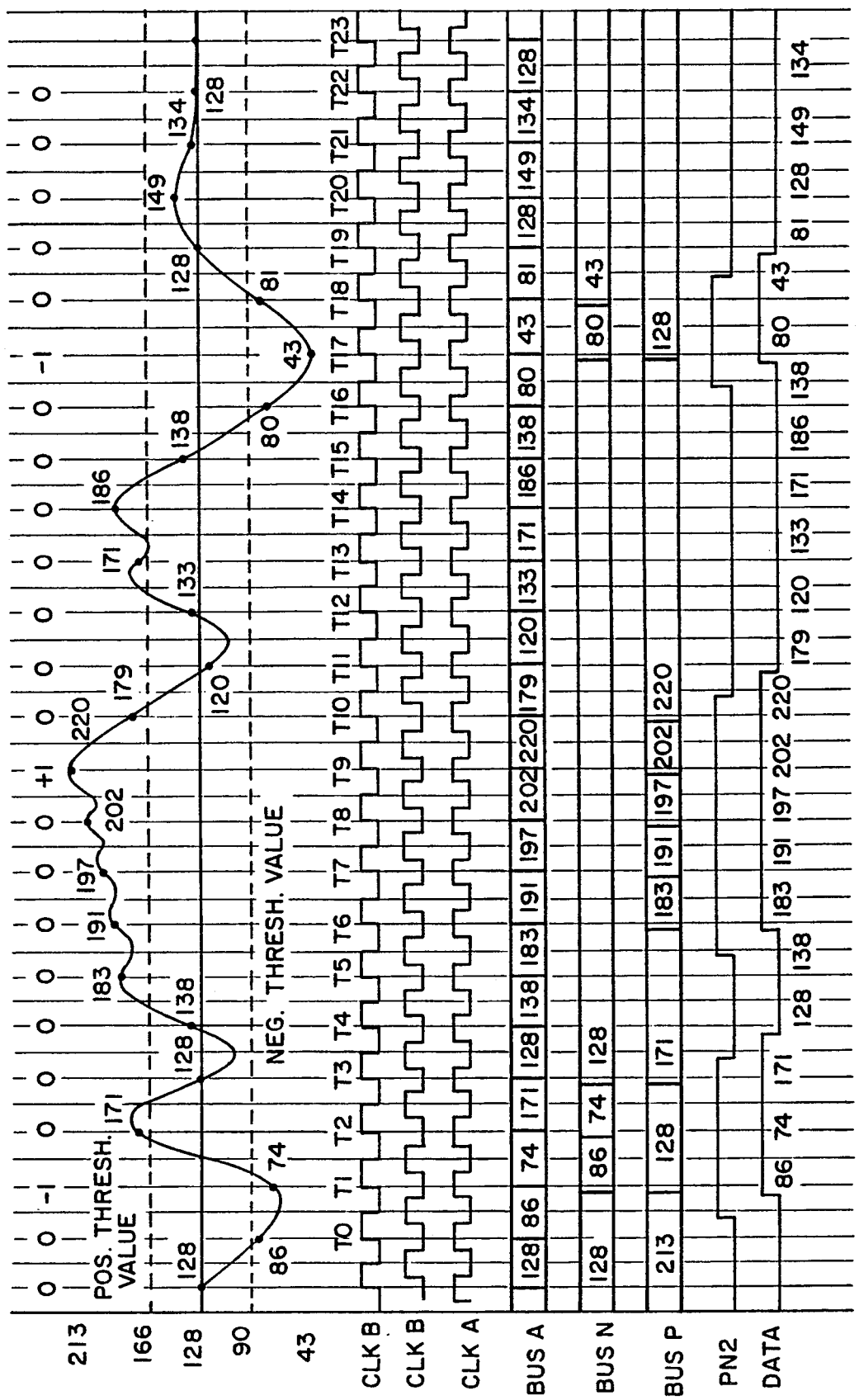
FIGS. 19 and 20, when

Assume a random data stream as shown on the top portion of FIG. 19 is received by post-peak eliminator 113 which then applies the indicated DATA, POLARITY and CLK AI signals to the pre-peak eliminator 114 of FIG. 9.

At time T0, a high on data path 120 representing peak 86 is received. It is latched in flip-flop FF0 and is shown on the line labeled DB on FIG. 20.

Figure 20:
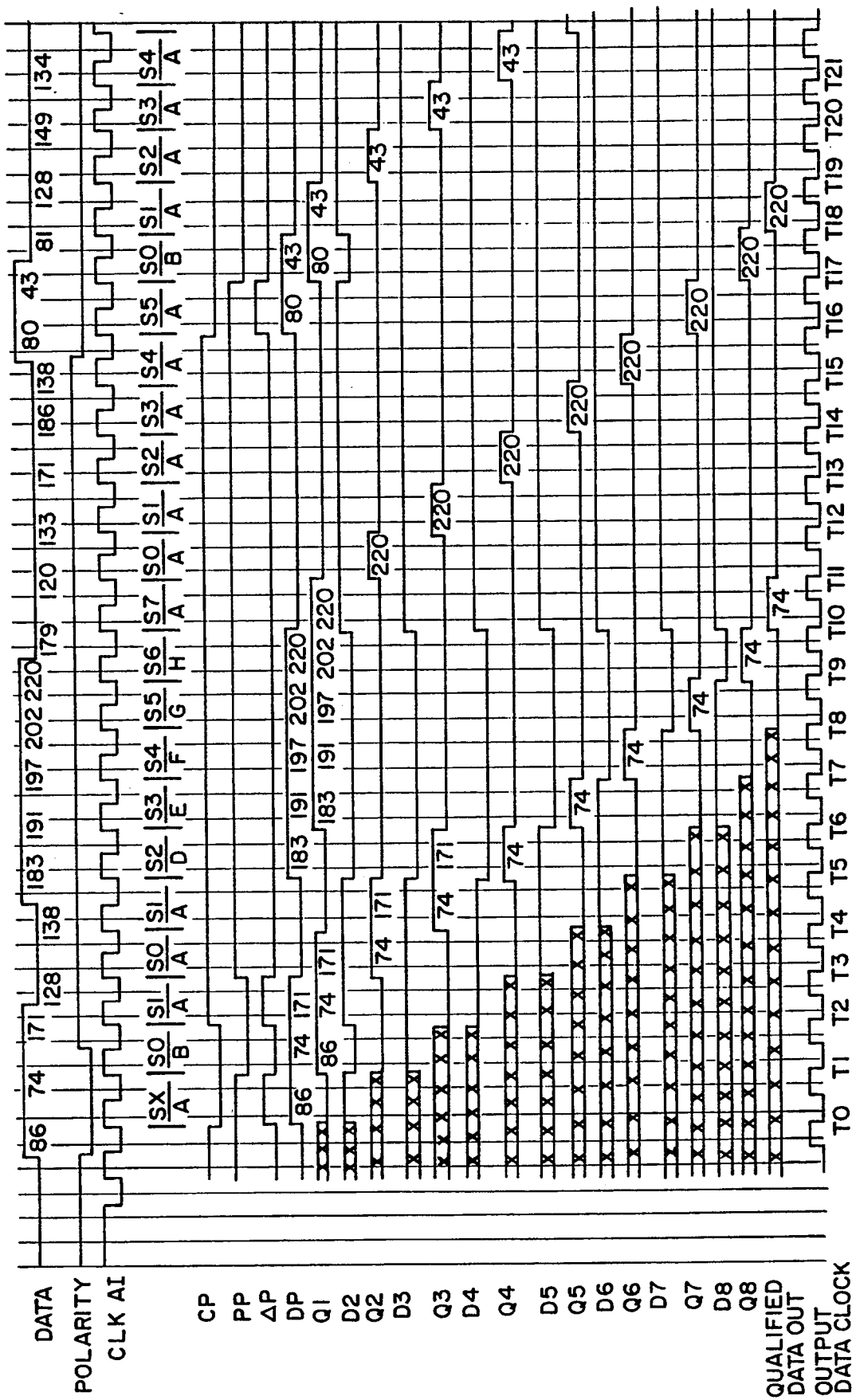

Also at time T0, a low on polarity path 121 is received indicating that peak 86 is of negative polarity. This low represents the first polarity change in the data received by the pre-peak eliminator as shown in FIG. 20. therefore, polarity hold element 903 outputs a high as shown on the line labeled ΔP on FIG. 20. This polarity change forces a transition of the block state machine from any state (SX) to state S0 and no data is blocked since information in the next bit cell will indicate whether the signal 86 is a valid data peak. this is shown on the waveform lines of FIG. 20 on the line below the CLK AI signal. On this line, the notation SX/A means that no matter what the present state (SX) of the block state machine, given the input signal 11, the present value of the output is determined to be blocking pattern A, and the next state of the block state machine after the clock pulse will be S0. As the block state machine transitions to state S0, the output will remain blocking pattern A until pulse 74 is received without a change in polarity. Thus, the inputs are changed to the new value of 10 at time T1. Since at time T1, pulse 74 is received without a change in polarity, pulse 86 is an invalid pulse. Invalid pulse 86 is not blocked and is shifted into FF1 and is shown on the line labeled Q1 in FIG. 20. Similarly, pulse 74 is shifted into FF0 and is shown on the line labeled DP on FIG. 20. Since the present state of the block state machine is now S0, the output will change to blocking pattern B immediately following the changing of the input signal from 11 to 10. This is also shown on FIG. 20 above the line designated CP by the symbol S0/B. Upon reception of the next clock pulse, the machine transitions to S1 with a blocking pattern of B and receives the pulse 171 at time T2. Also at this time, the logic value received on polarity path 121 has changed from this previous value of 0 which it had in S0 to 1. This causes ΔP signal to be 1. Thus the inputs are changed to the new value of 11 at time T2. The output will change to blocking pattern A immediately following the changing of the input signal from 10 to 11. Pulse 171 is stored in register FF0; pulse 74 is advanced to FF1. However, the signal 86, which is an invalid pre-peak preceding the valid peak 74, was eliminated by the filter pattern of B since, as shown on FIG. 14, the filter pattern of B causes the $Z_0$ signal to be a 0. This effectively blocks the Q1 signal, regardless of its value, from being applied through the block logic 1102 as a D2 signal to the input of flip-flop FF2. This prevents the 86 signal from advancing from flip-flop FF1 to FF2 when pulse 171 is received.

Next, pulse 128 is received and since it does not exceed the threshold value, it is represented by a low on data input lead 120. Also no change in polarity signal is received on path 120 at this time, and therefore the data input signal and the ΔP signal have a pattern of 00. The machine is in state S0 at pulse time 128. The pattern of 00 for pulse time 128 causes it to have a filter pattern of A. It is possible that the 171 signal represents a valid pulse, and therefore the 171 signal is shifted from flip-flop FF1 to flip-flop FF2. At the reception of signal 138, the signal pattern is 00 on the data input DP and the ΔP lead and the machine is in state S1 with a filter pattern of A. The signal 74 is now advanced to flip-flop FF3 while the signal of 171 is advanced to flip-flop FF2. Next, signal 183 is received giving a signal pattern of 10 for the data input DP and the ΔP lead. The machine therefore has a filter pattern of D. Signal 74 advances to flip-flop FF4 of FIG. 10. Signal 171 advances to flip-flop FF3 and the machine has a filter pattern of D which blocks signal D2, D3, and D4. At this time signal 183 is in flip-flop FF0. Signal 171 is in flip-flop FF3, and signal 74 is in flip-flop FF4. Next, signal 191 is received and the signal pattern is 10. The machine now is in state S3 with a filter pattern of E in response to this signal pattern of 10. This filter pattern of E will block the signal 183 in flip-flop FF1 from advancing to flip-flop FF2. It also blocks signal 171 now in FF3 from advancing to FF4. Next, the signal 197 is received and the signal pattern is 10. The machine now has a filter pattern of F. The filter pattern of F will block the signal 191 on the next clock pulse and signal 74 continues its advancement and is now in flip-flop FF6. Similarly, the signals 202 and 220 are received with a signal pattern of 10. The signal 202 will cause the machine to have a filter pattern of G while signal 220 causes the machine to have a filter pattern of H. The blocking patterns of G & H, respectively, block the signals 197 and 202 as being invalid pre-peaks. The signal 74 continues its advancement and is now in flip-flop FF8. Signal 179 is not received at time T10 since it is an invalid post that is eliminated by the post-peak eliminator. The receipt of no signal at time T10 represents a signal pattern of 00 and the machine will have a blocking pattern of A. The signals 120 and 133 are received with a signal pattern of 00 since they do not exceed the threshold value of the post-peak eliminator 113 and the machine advances from state 0 to state 1 and then to state 2 with a blocking pattern of A.

Signals 171 and 186 are not received since they represent invalid post-peaks.

The machine finally receives pulse 80 with a signal pattern of 11. This causes it to have a filter pattern of A and on the next clock pulse will transition back to state S0. Next, the signal 43 is received and the signal pattern is 10. This causes the machine to have a filter pattern of B which will block signal 80 from advancing to flip-flop FF2. Signal 81 is a post peak and is not received. Next, the signal 128 is received represented by a signal pattern of 00. The machine will advance with a filter pattern of A from state S2 to state S3 on the next clock pulse. The machine responds in a similar manner to the signals 149, 134, and 128, all of which are represented by a signal pattern of 00 and associated with a filter pattern of A. The signal 43 continues its advancement within the machine in the same manner as previously described for the signal 220.

Signal 74 reached the final stage of the register of FIG. 20 as it entered flip-flop FF9 at T10. This caused the signal to be applied to the qualified data output lead 123. This signal 74 appears on the output lead 124 when at the time the signal 179 is received. In an analogous manner, the signal 220 is advanced within the machine and appears on output lead 123 when signal 81 is received.

While a specific embodiment of this invention has been disclosed, it is expected that those skilled in the art can and will design alternate embodiments of this invention that fall within the scope of the appended claims.

We claim:

1. A system for eliminating invalid peaks from a received signal stream containing valid data peaks, said system comprising:

means for receiving said signal stream with each of said peaks being represented as a binary number whose magnitude specifies the amplitude of the peak represented by said binary number;

a post peak eliminator for eliminating invalid post peaks received subsequent to a valid data peak in said signal stream with each of said invalid post peaks being of a lesser amplitude than said valid data peak and being of the same polarity as said valid data peak, said post peak eliminator comprising;

digital hold register means for storing a digital value representing the amplitude of a received peak, means for comparing a digital value representing the amplitude of each subsequently received peak with the digital value of a previously received peak currently stored in said hold register means, means for outputting a data pulse representing a subsequently received peak if the digital value of said subsequently received peak is greater than the digital value of the peak currently stored in said hold register means and for updating said hold register means with the digital value of said subsequently received peak, means for maintaining the digital value for a peak currently in said hold register means while inhibiting the outputting of a data pulse in response the reception of a subsequent peak of a lessor digital value than the digital value of the peak currently in said hold register means; and means for outputting a clock pulse and a polarity signal concurrent with the outputting of each data pulse with said polarity signal specifying the polarity of the peak represented by each outputted data pulse;

said system further including a pre-peak eliminator for receiving each data pulse and clock pulse and said polarity signals outputted by said post peak eliminator;

means in said pre-peak eliminator operable in response to said reception of said outputted data pulses and said clock pulses and said polarity signals to eliminate the received data pulses representing invalid pre-peaks and for applying a data pulse representing each valid peak to a utilization means.

2. The system of claim 1 wherein said post peak detector further includes threshold means for inhibiting the outputting of data pulses representing received peaks having less than a fixed amplitude.

3. The system of claim 1 wherein said post peak detector further includes dynamically controlled threshold means for inhibiting the outputting of data pulses representing peaks having less than a variably specified amplitude;

said dynamically controlled threshold means comprising means controlled by the digital value of a received negative peak for specifying the threshold to be used for the reception of signals representing received positive peaks; and said dynamically controlled threshold means further comprising means controlled by the digital value of a received positive peak for specifying the threshold to be used for the reception of signals representing received negative peaks.

4. The system of claim 1 wherein said post peak detector further includes dynamically controlled threshold means for inhibiting the outputting of data pulses representing received peaks having less than a variably specified amplitude;

said dynamically controlled threshold means comprising:

memory means for receiving as address information the digital value representing the amplitude of each received peak;

said memory means being responsive to each receipt of a digital value for outputting from said memory means a threshold value representing said digital value;

means for applying said threshold value from said memory means to threshold register means;

said memory means and said threshold register means being controlled by the digital value of a negative peak for specifying the threshold to be used for the reception of signals representing positive peaks; and said memory means and said threshold register means being controlled by the digital value of a positive peak for specifying the threshold to be used for the reception of signals representing negative peaks.

5. The system of claim 4 wherein said threshold register means comprises:

a positive threshold register for receiving from said memory the threshold to be used for the reception of signals representing positive peaks; and a negative threshold register for receiving from said memory the threshold to be used for the reception of signals representing negative peaks.

6. The system of claim 5 wherein said system further comprises:

means responsive to the reception of a signal whose amplitude exceeds a negative threshold specified by said negative threshold register for entering into said positive threshold register a positive threshold value outputted from said memory means; and means responsive to the reception of a signal whose amplitude exceeds a positive threshold specified by said positive threshold register for entering into said negative threshold register a negative threshold value outputted from said memory means.

7. The system of claim 1 wherein said hold register means comprises:

a positive hold register, a negative hold register, means for entering for entering the digital value of a received peak into said positive hold register when said newly received peak has an amplitude greater than the amplitude of a previously received peak whose digital value is currently stored in said positive hold register, means for entering for entering the digital value of a received peak into said negative hold register when said newly received peak has a negative amplitude greater than the negative amplitude of a previously received peak whose digital value is currently stored in said negative hold register, means responsive to the entry into said positive hold register of a digital value of a newly received peak for resetting said negative hold register to a baseline value for use on a comparison upon the next receipt of a peak having digital value representing a negative amplitude, means responsive to the entry into said negative hold register of a digital value of a newly received peak for resetting said positive hold register to a baseline value for use on a comparison upon the next receipt of a peak having a digital value representing a positive amplitude.

8. The system of claim 1 wherein said means for outputting comprises:

a peak magnitude comparator for comparing the digital value of a newly received peak with the digital value for a previously received peak stored in said hold register means;

said peak magnitude comparator being effective when the digital value of a newly received peak exceeds the digital value for a previously received peak stored in said hold register means for controlling the generation of a data pulse representing said newly received peak; and said peak magnitude comparator being effective when the digital value of a newly received peak does not exceed the digital value for a previously received peak stored in said hold register means for inhibiting the generation of a data pulse representing said newly received peak.

9. The system of claim 8 wherein said post peak detector further includes:

threshold detector magnitude detector means effective in response to each receipt of a peak whose digital does not exceed a specified threshold for inhibiting the generation of an output pulse to said pre-peak detector;

said threshold detector magnitude detector means being effective in response to each receipt of a peak whose digital does exceed a specified threshold for inhibiting the generation of an output pulse to said pre-peak detector.

10. A system for eliminating invalid peaks from a received signal stream containing valid data peaks, said system comprising:

means for receiving said signal stream with each of said peaks being represented as a binary number whose magnitude specifies the amplitude of the peak represented by said binary number;

a post peak eliminator for eliminating invalid post peaks subsequent to a valid data peak in said stream and of a lesser amplitude than said valid data peak, said post peak eliminator comprising;

means in said post peak eliminator for outputting to a pre-peak eliminator data pulses representing valid data peaks as well as invalid pre-peaks preceding a valid data peak and of the same polarity a valid data peak;

means for outputting a clock pulse and a polarity signal concurrent with the outputting of each data pulse with said polarity signal specifying the polarity of the peak represented by each outputted data pulse;

said system further including a pre-peak eliminator for eliminating as invalid pre-peaks preceding a subsequently received valid data peak; said pre-peak eliminator comprising;

a shift register;

means for receiving each data pulse and clock pulse and polarity signal outputted by said post peak eliminator;

means controlled by said received clock pulses for entering into said shift register each received data pulse;

means for advancing said data pulse within said shift register under control of said received clock pulses, control logic for operating said shift register in response to the reception of said clock pulses and said polarity signals to eliminate from said shift register a data pulse representing an invalid pre-peak if the next received data pulse is of the same polarity as the eliminated data pulse; and means for outputting as a valid data pulse the last data pulse received in a sequence of received data pulses representing received peaks of the same polarity as specified by said polarity signal.

11. The system of claim 10 wherein said control logic comprises;

a data blocker serially interconnecting the output of each shift register stage with the input of the next shift register stage;

means for controlling said data blocker in response to each reception of a clock pulse to determine the shift register stages whose inputs are to be inhibited from receiving a data pulse from the immediate preceding shift register stage.

12. The system of claim 11 wherein said means for controlling said data blocker comprises a state machine operable in response to each reception of a signal pattern represented by the instantaneous value of said polarity signal and the presence or absence of a data pulse when a clock pulse is received for operating said data blocker for controlling the interconnection of a shift register stage with the next adjacent shift register stage.

13. The system of claim 12 comprising means in said data blocker for eliminating invalid pre-peaks that are separated from a subsequently received valid data peak of the same polarity by a bit cell spacing that is limited only by the number of stages in said shift register.

14. A system for eliminating invalid signal peaks from a signal stream containing both invalid signal peaks and valid data signal peaks, said invalid signal peaks comprising invalid pre-peak signals preceding a valid data signal peak as well as invalid post peaks following a valid data signal peak, said system comprising:

a post peak eliminator comprising;

means for receiving said signal stream with each of said peaks being represented as a binary number whose magnitude specifies the amplitude of the peak represented by said binary number;

digital processing circuitry responsive to the receipt of peaks in said signal stream for detecting invalid post-peaks and for outputting data pulses representing valid data peaks as well as invalid pre-peaks to a pre-peak eliminator;

said pre-peak eliminator comprising;

a shift register for receiving said pulses outputted from said post peak eliminator; and control logic for operating said shift register to eliminate an invalid pre-peak in response to the reception of the next received data pulse of the same polarity as the invalid pre-peak pulse.

15. A method of eliminating invalid peaks from a received signal stream containing valid data peaks, said method comprising the steps of:

receiving said signal stream with each of said peaks being represented as a binary number whose magnitude specifies the amplitude of the peak represented by said binary number;

operating a post peak eliminator for eliminating invalid post peaks received subsequent to a valid data peak in said signal stream with each of said invalid post peaks being of a lesser amplitude than said valid data peak and being of the same polarity as said valid data peak, method of operating said post peak eliminator comprising the steps of;

storing a digital value representing the amplitude of a received peak in digital hold register means, comparing a digital value representing the amplitude of each subsequently received peak with the digital value of a previously received peak currently stored in said hold register means, outputting a data pulse representing a subsequently received peak if the digital value of said subsequently received peak is greater than the digital value of the peak currently stored in said hold register means and for updating said hold register means with the digital value of said subsequently received peak, maintaining the digital value for a peak currently in said hold register means while inhibiting the outputting of a data pulse in response the reception of a subsequent peak of a lessor digital value than the digital value of the peak currently in said hold register means; and outputting a clock pulse and a polarity signal concurrent with the outputting of each data pulse with said polarity signal specifying the polarity of the peak represented by each outputted data pulse;

said system further including a pre-peak eliminator for receiving each data pulse and clock pulse and said polarity signals outputted by said post peak eliminator;

said method further comprising the step of:

operating said pre-peak eliminator in response to said reception of said outputted data pulses and said clock pulses and said polarity signals to eliminate the received data pulses representing invalid pre-peaks and for applying a data pulse representing each valid peak to a utilization means.

16. The method of claim 15 wherein said post peak detector further includes threshold means for inhibiting the outputting of data pulses representing received peaks having less than a fixed amplitude.

17. The method of claim 15 wherein said post peak detector further includes dynamically controlled threshold means for inhibiting the outputting of data pulses representing peaks having less than a variably specified amplitude;

said method further comprising the step of;

operating said dynamically controlled threshold means including means controlled by the digital value of a received negative peak for specifying the threshold to be used for the reception of signals representing received positive peaks; and operating said dynamically controlled threshold means including means controlled by the digital value of a received positive peak for specifying the threshold to be used for the reception of signals representing received negative peaks.

18. The method of claim 15 wherein said post peak detector further includes dynamically controlled threshold means for inhibiting the outputting of data pulses representing received peaks having less than a variably specified amplitude;

said method further comprising the steps of:

operating said dynamically controlled threshold means comprising:

memory means for receiving as address information the digital value representing the amplitude of each received peak;

operating said memory means being responsive to each receipt of a digital value for outputting from said memory means a threshold value representing said digital value;

operating means for applying said threshold value from said memory means to threshold register means;

operating said memory means and said threshold register means being controlled by the digital value of a negative peak for specifying the threshold to be used for the reception of signals representing positive peaks; and operating said memory means and said threshold register means being controlled by the digital value of a positive peak for specifying the threshold to be used for the reception of signals representing negative peaks.

19. The method of claim 18 wherein said threshold register means comprises:

a positive threshold register for receiving from said memory the threshold to be used for the reception of signals representing positive peaks; and a negative threshold register for receiving from said memory the threshold to be used for the reception of signals representing negative peaks.

20. The method of claim 19 wherein said method further comprises the steps of:

operating means responsive to the reception of a signal whose amplitude exceeds a negative threshold specified by said negative threshold register for entering into said positive threshold register a positive threshold value outputted from said memory means; and operating means responsive to the reception of a signal whose amplitude exceeds a positive threshold specified by said positive threshold register for entering into said negative threshold register a negative threshold value outputted from said memory means.

21. The method of claim 15 wherein said hold register means comprises:

a positive hold register, a negative hold register, means for entering for entering the digital value of a received peak into said positive hold register when said newly received peak has an amplitude greater than the amplitude of a previously received peak whose digital value is currently stored in said positive hold register, means for entering for entering the digital value of a received peak into said negative hold register when said newly received peak has a negative amplitude greater than the negative amplitude of a previously received peak whose digital value is currently stored in said negative hold register, means responsive to the entry into said positive hold register of a digital value of a newly received peak for resetting said negative hold register to a baseline value for use on a comparison upon the next receipt of a peak having digital value representing a negative amplitude, means responsive to the entry into said negative hold register of a digital value of a newly received peak for resetting said positive hold register to a baseline value for use on a comparison upon the next receipt of a peak having a digital value representing a positive amplitude.

22. The method of claim 15 wherein said step of outputting a data pulse comprises the step of:

operating a peak magnitude comparator for comparing the digital value of a newly received peak with the digital value for a previously received peak stored in said hold register means;

said peak magnitude comparator being effective when the digital value of a newly received peak exceeds the digital value for a previously received peak stored in said hold register means for controlling the generation of a data pulse representing said newly received peak; and said peak magnitude comparator being effective when the digital value of a newly received peak does not exceed the digital value for a previously received peak stored in said hold register means for inhibiting the generation of a data pulse representing said newly received peak.

23. The method of claim 18 wherein the step of operating said post peak detector further includes:

operating threshold detector magnitude detector means effective in response to each receipt of a peak whose digital does not exceed a specified threshold for inhibiting the generation of an output pulse to said pre-peak detector;

said threshold detector magnitude detector means being effective in response to each receipt of a peak whose digital does exceed a specified threshold for inhibiting the generation of an output pulse to said pre-peak detector.

24. A method for eliminating invalid peaks from a received signal stream containing valid data peaks, said method comprising the steps of:

receiving said signal stream with each of said peaks being represented as a binary number whose magnitude specifies the amplitude of the peak represented by said binary number;

operating a post peak eliminator for eliminating invalid post peaks subsequent to a valid data peak in said stream and of a lesser amplitude than said valid data peak, said post peak eliminator comprising;

operating means in said post peak eliminator for outputting to a pre-peak eliminator data pulses representing valid data peaks as well as invalid pre-peaks preceding a valid data peak and of the same polarity a valid data peak;

outputting a clock pulse and a polarity signal concurrent with the outputting of each data pulse with said polarity signal specifying the polarity of the peak represented by each outputted data pulse;

said system further including a pre-peak eliminator for eliminating as invalid pre-peaks preceding a subsequently received valid data peak; said pre-peak eliminator comprising;

a shift register;

said method further comprising the steps of:

receiving each data pulse and clock pulse and polarity signal outputted by said post peak eliminator;

by said received clock pulses for entering into said shift register each received data pulse under control of;

advancing said data pulse within said shift register under control of said received clock pulses, operating said shift register in response to the reception of said clock pulses and said polarity signals to eliminate from said shift register a data pulse representing an invalid pre-peak if the next received data pulse of the same polarity as the eliminated data pulse; and outputting as a valid data pulse the last data pulse received in a sequence of received data pulses representing received peaks of the same polarity as specified by said polarity signal.

25. The method of claim 24 wherein said controller comprises;

a data blocker serially interconnecting the output of each shift register stage with the input of the next shift register stage;

said method further comprising the step of:

controlling said data blocker in response to each reception of a clock pulse to determine the shift register stages whose inputs are to be inhibited from receiving a data pulse from the immediate preceding shift register stage.

26. The method of claim 24 wherein said means for controlling said data blocker comprises a state machine operable in response to each reception of a signal pattern represented by the instantaneous value of said polarity signal and the presence of absence of a data pulse when a clock pulse is received for operating said data blocker for controlling the interconnection of a shift register stage with the next adjacent shift register stage.

27. The method of claim 26 comprising the steps of operating said data blocker for eliminating invalid pre-peaks that are separated from a subsequently received valid data peak of the same polarity by a bit cell spacing that is limited only by the number of stages in said shift register.

28. A method for eliminating invalid signal peaks from a signal stream containing both invalid signal peaks and valid data signal peaks, said invalid signal peaks comprising invalid pre-peak signals preceding a valid data signal peak as well as invalid post peaks following a valid data signal peak, said method comprising the steps of:

operating a post peak eliminator for receiving said signal stream with each of said peaks being represented as a binary number whose magnitude specifies the amplitude of the peak represented by said binary number;

operating digital processing circuitry in said post peak eliminator in response to the receipt of peaks in said signal stream for detecting invalid post-peaks and for outputting data pulses representing valid data peaks as well as invalid pre-peaks to a pre-peak eliminator;

operating a pre-peak eliminator including a shift register for receiving said pulses outputted from said post peak eliminator; and operating said shift register to eliminate an invalid pre-peak in response to the reception of the next received data pulse of the same polarity as the invalid pre-peak pulse.

* * * * *